United States Patent [19]

Waksman et al.

[11] Patent Number: 4,745,633
[45] Date of Patent: May 17, 1988

[54] OPTICAL IMAGE ENCODING AND COMPARING USING SCAN AUTOCORRELATION

[76] Inventors: Peter Waksman, 54 Minot Rd., Concord, Mass. 01742; Ernest Greene, P.O. Box 413, Sun Valley, Calif. 91352

[21] Appl. No.: 897,780

[22] Filed: Aug. 18, 1986

[51] Int. Cl.$^4$ .......................... G06K 9/36; G06K 9/64
[52] U.S. Cl. ........................................ 382/56; 382/42; 358/260
[58] Field of Search ....................... 382/25, 36, 42, 56, 382/; 364/604, 728, 819; 358/260, 261

[56] References Cited

U.S. PATENT DOCUMENTS

| | | | |
|---|---|---|---|
| 3,222,638 | 12/1965 | Shelton | 382/42 |
| 3,267,431 | 8/1966 | Greenberg et al. | 382/42 |
| 3,860,909 | 1/1975 | Demonte | 382/25 |
| 4,115,761 | 9/1978 | Ueda et al. | 382/25 |
| 4,398,177 | 8/1983 | Bernhardt | 382/18 |

FOREIGN PATENT DOCUMENTS 1237534  6/1971  United Kingdom ................. 382/42

OTHER PUBLICATIONS

Rosenfeld, A.; Image Analysis: Problems, Progress and Prospects. *Pattern Recognition*, 1984, 3-12.
Wong, E. & Steppe J. A.; Invariant Recognition of Geometric Shapes, in S. Watanabe, *Methodologies of Pattern Recognition*, Academic Press, N.Y., 1969, 535-546.

*Primary Examiner*—James J. Groody
*Assistant Examiner*—Michael D. Parker

[57] ABSTRACT

A method for encoding shape and pattern information from the image (20) of an electronic camera (10). The image is converted into a discrete array of values (30), and the values in the cross sections of the array are sampled (circuit 40), marked for transitions (circuit 50), and the transition markers are then autocorrelated by circuit 60 to form an autocorrelation function for each cross section. The autocorrelation functions corresponding to each cross section are then combined by circuit 70 into a global summary function, which provides a quantitative measure of the information contained in the image. The global summary functions which are derived from images may be used to judge their similarity or otherwise compare and classify them.

20 Claims, 29 Drawing Sheets

| $a_1$ | $a_2$ | b |
|---|---|---|
| 0 | 0 | 0 |
| 0 | 1 | +1 |
| 1 | 0 | -1 |
| 1 | 1 | 0 |

| $S_x$ | $D_x$ | $S_y$ | $D_y$ | $PS_{xy}$ | $PD_{xy}$ | Signal Binary Equivalent |
|---|---|---|---|---|---|---|
| 0 | 0 | 0 | 0 | 0 | 0 | $0 \times 0 = 0$ |
| 0 | 1 | 0 | 0 | 0 | 0 | $1 \times 0 = 0$ |
| 1 | 1 | 0 | 0 | 0 | 0 | $(-1) \times 0 = 0$ |
| 0 | 0 | 0 | 1 | 0 | 0 | $0 \times 1 = 0$ |
| 0 | 1 | 0 | 1 | 0 | 1 | $1 \times 1 = 1$ |
| 1 | 1 | 0 | 1 | 1 | 1 | $(-1) \times 1 = -1$ |
| 0 | 0 | 1 | 1 | 0 | 0 | $0 \times (-1) = 0$ |
| 0 | 1 | 1 | 1 | 1 | 1 | $1 \times (-1) = -1$ |
| 1 | 1 | 1 | 1 | 0 | 1 | $(-1) \times (-1) = 1$ |

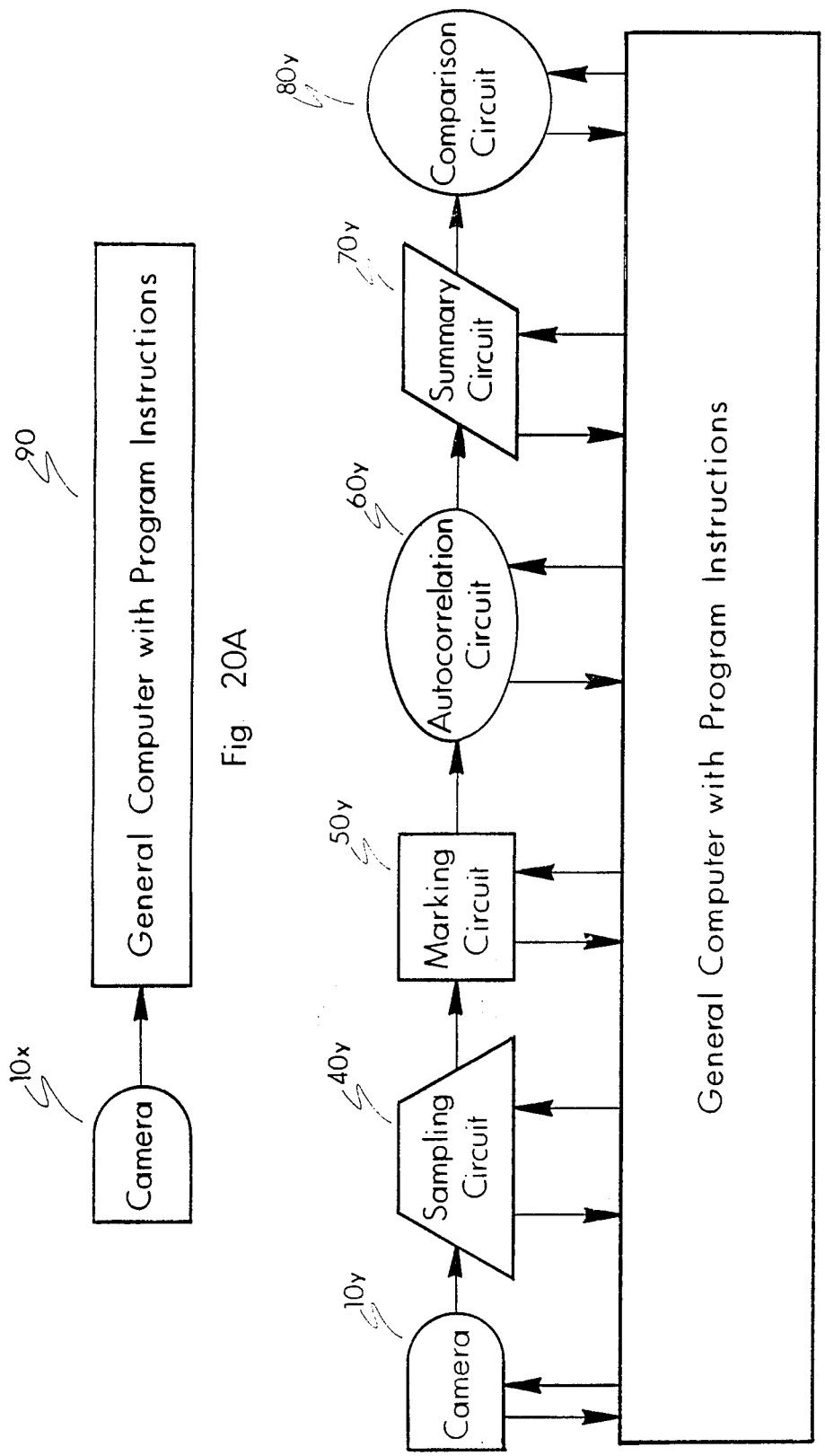

OPTICAL IMAGE ENCODING AND COMPARING USING SCAN AUTOCORRELATION

BACKGOUND—FIELD OF INVENTION

This invention relates to the analysis of shapes and patterns, particularly to a system for performing such analysis electronically using autocorrelation.

BACKGROUND—PRIOR ART

Most machines designed to recognize forms (such as printed character analyzers), represent the image (e.g. a printed or typed character) by a two dimensional array of numbers in electronic form. The numbers usually represent the brightness and/or color levels in the image.

The shape or pattern contained in the array is then analyzed by one of several methods. Most often elaborate "segmentation" procedures are used. These break the shape or pattern into its component "features," which are analyzed individually and then collectively. (For example, see U.S. Pat. No. 4,115,761 to Ueda et al. (1978), and Image Analysis: Problems, Progress and Prospects, A. Rosenfeld, 17, Pattern Recognition 3-12 (1984) for a review.)

Alternatively, the shape properties of the array may be evaluated by using the information contained in the rows, columns, and diagonals (called the "cross sections") of the array. The information collected along each cross section is encoded for certain characteristics, and this analysis is combined with the summaries from other cross sections. This provides information which the machine uses to classify the pattern or shape contained by the image, or for comparison among the images being analyzed. For examples of this approach, see U.S. Pat. Nos. 3,860,909 to Demonte (1975) and 4,398,177 to Bernhardt (1983).

Each of the previous methods has its disadvantages. The method of Ueda et al. (op. cit.) requires an exhaustive study of the subject matter before the machine can be designed. The basic component shapes or "features" must be selected beforehand, and a single machine cannot be adapted to a variety of recognition tasks. The method of Bernhardt (op. cit.) requires that the location of the cross section be retained as part of the summary information. Storing this location puts a burden on the memory of the system, and analysis is not feasible if the camera and object are in relative motion.

An analysis method described by E. Wong & J. Steppe (Invariant Recognition of Geometric Shapes, in S. Watanabe, *Methodologies of Pattern Recognition*, Academic Press: N.Y., 1969, pp. 535-546), eliminates the requirement to store location of the cross section, and is not sensitive to relative motion between the camera and its object. These authors suggest that the shape properties can be summarized by a frequency distribution of chord lengths. Chord lengths, taken at various angles, are measured from edge to edge across the form, and the frequency of observed length is plotted as the dependent variable with all possible lengths being the independent variable. However, they consider only nondiscrete sampling of the image form, using a (theoretically) infinite number of "scan lines" or "scan angles," and measuring a continuum of possible lengths along each line. This is impractical for machine purposes. Additionally, the "chord length" measure provides a summary which is not useful in the analyis of complex forms.

Most importantly, previous methods of cross sectional analysis have provided arbitrary or overly limited definitions of what constitutes the information contained by the cross section. Thus far, none have provided a comprehensive and flexible criterion for extracting information from complex patterns and shapes, and providing for classification and comparison of the images as would be needed for effective machine vision.

OBJECTS AND ADVANTAGES OF THE PRESENT PROCEDURE

Accordingly, one object and advantage of the present invention is to provide a fundamental and flexible definition of what constitutes information in a cross section. Another advantage is the specification of efficient procedures for combining the information from different cross sections into a quantitative summary, which may then be used for purposes of classification and comparison among shapes and patterns. The summary process is statistical, which eliminates the requirement for storing the location of each cross section. This reduces the memory load, and makes the resulting summary fairly insensititive to translation of the shape or pattern within the field of view. Using such a system, it possible to evaluate objects which are in motion, or to design a hand-held camera. The method has the additional advantage that it can be used to analyze complex shapes and patterns, and it is not necessary to specify the characteristics and features of the visual elements in advance.

Further objects and advantages will become apparent from a consideration of the ensuing descriptions and accompanying drawings.

SUMMARY OF DRAWING FIGURES

Figure 9A:
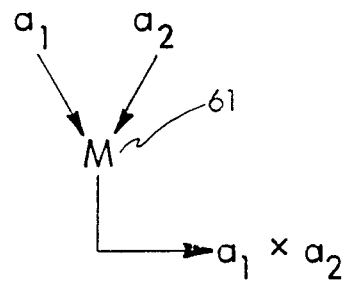
Figure 9B:
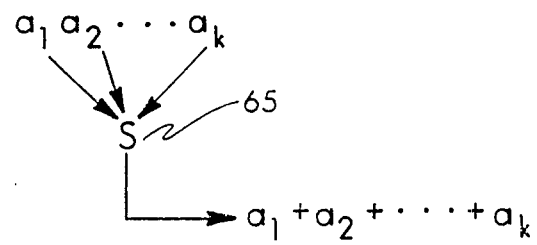
Figure 9C:
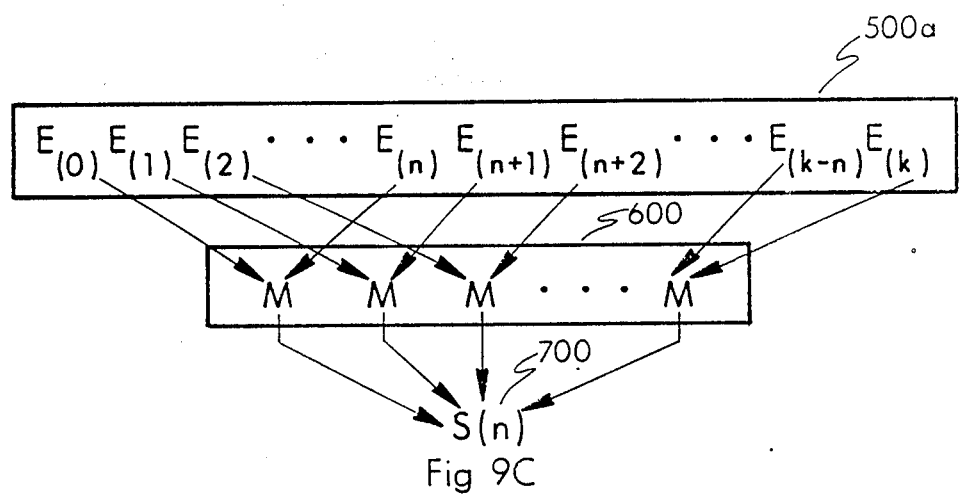

FIGS. 9A, 9B, and 9C show the logic elements required for autocorrelation, and illustrated formal relationships among the elements.

FIGS. 10A-10E further illustrate the formal relationship among elements for calculating the autocorrelation function.

Figure 11:
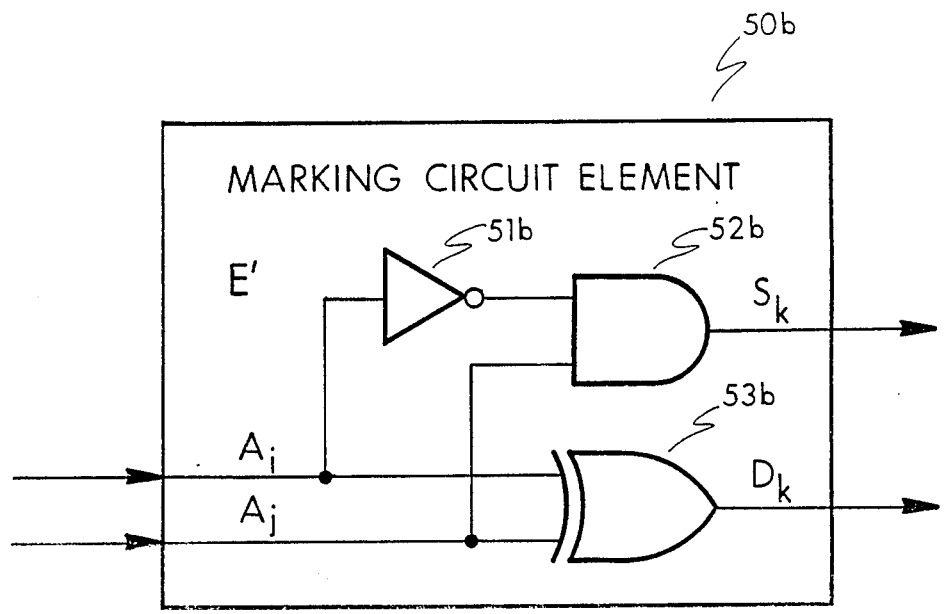

FIG. 11 shows a basic electronic component for marking transitions.

Figure 12:
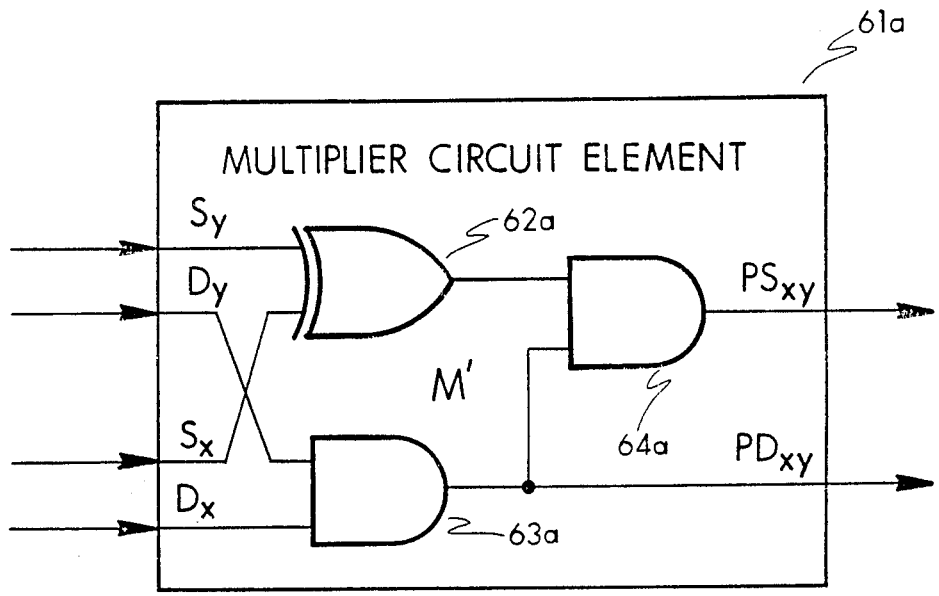

FIG. 12 shows a basic electronic component for autocorrelating.

Figure 13A:
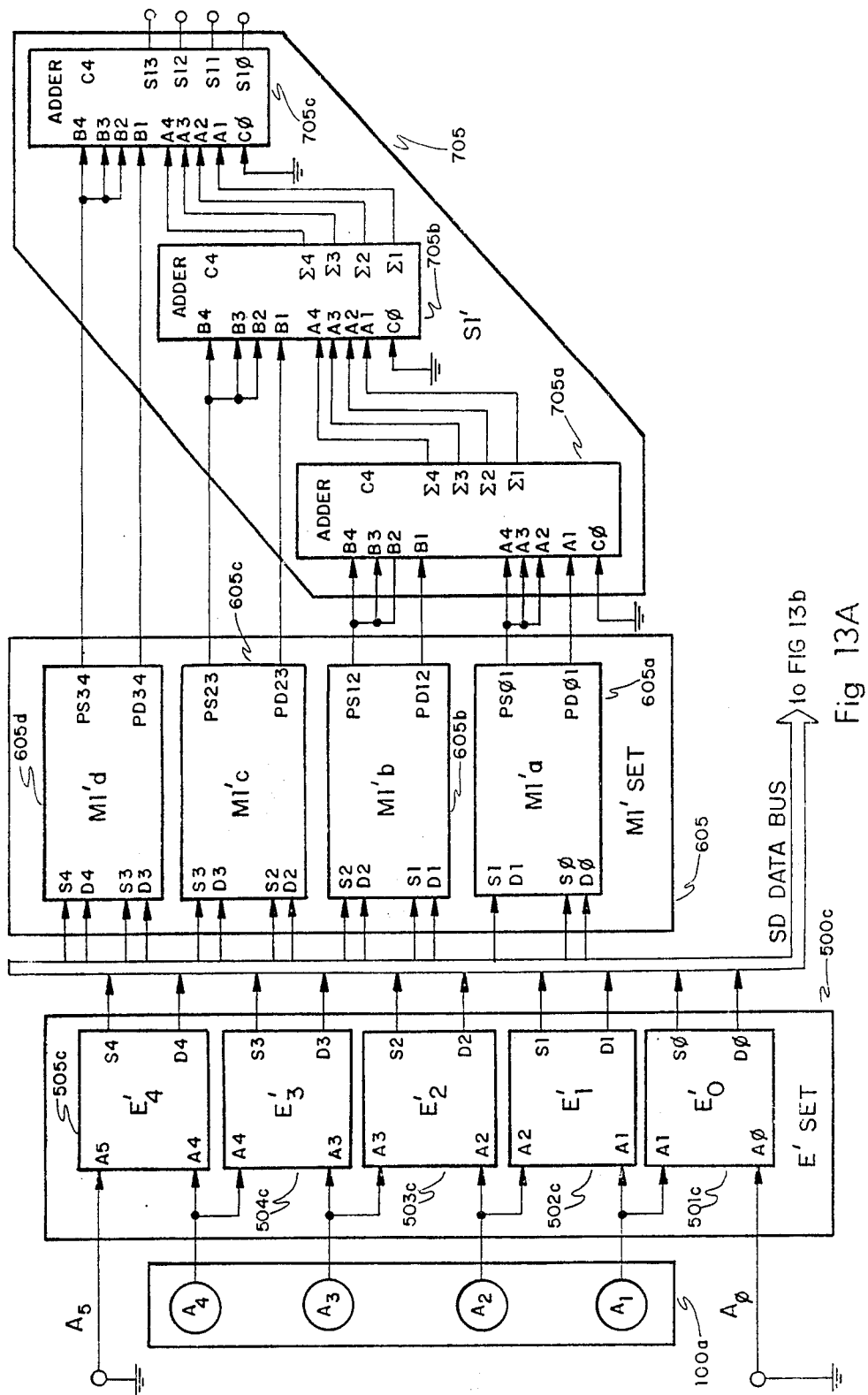
Figure 13B:
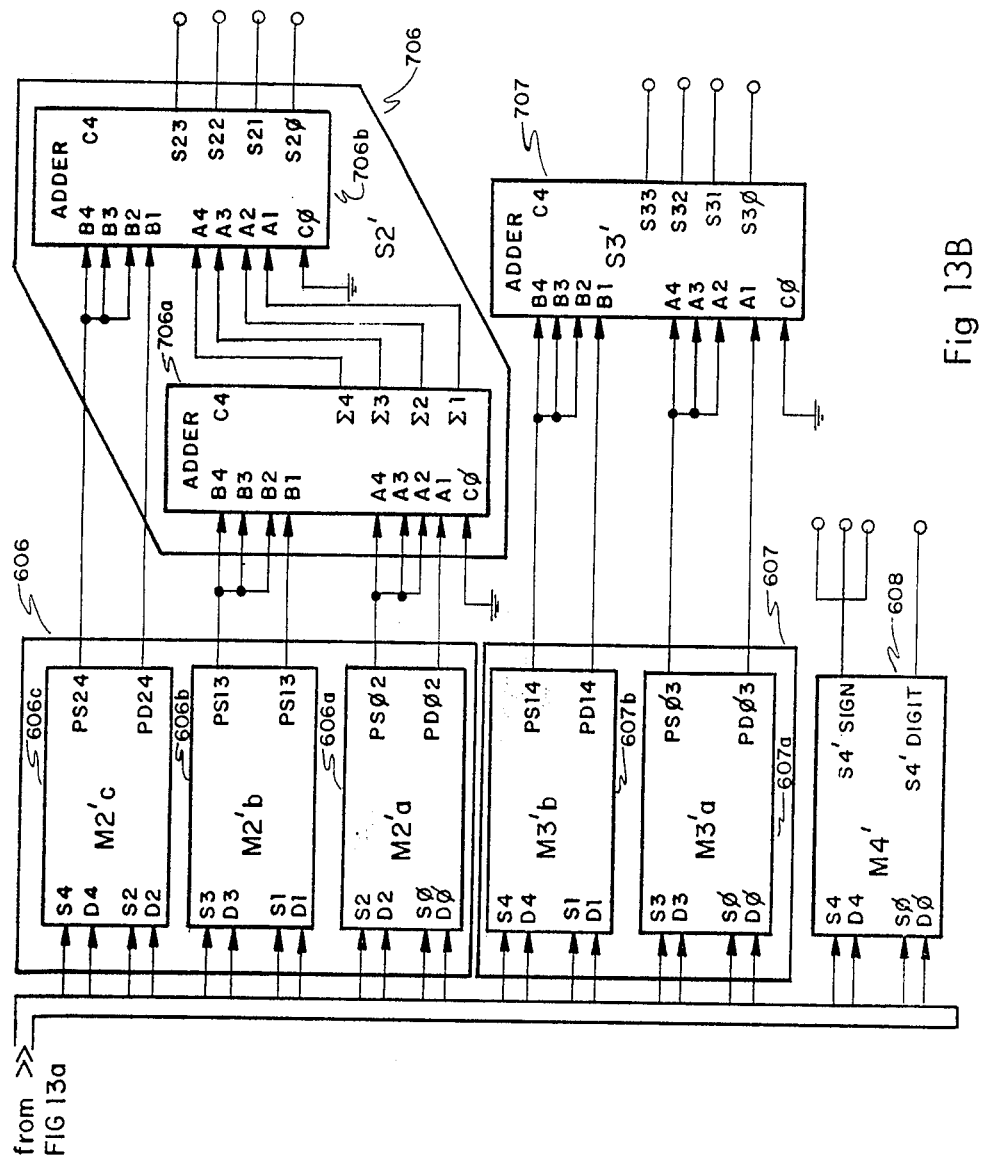

FIGS. 13A and 13B show a parallel circuit design for calculating the autocorrelation function.

FIGS. 14A–14D show a serial circuit design for calculating the autocorrelation function from a temporal signal.

Figure 15:
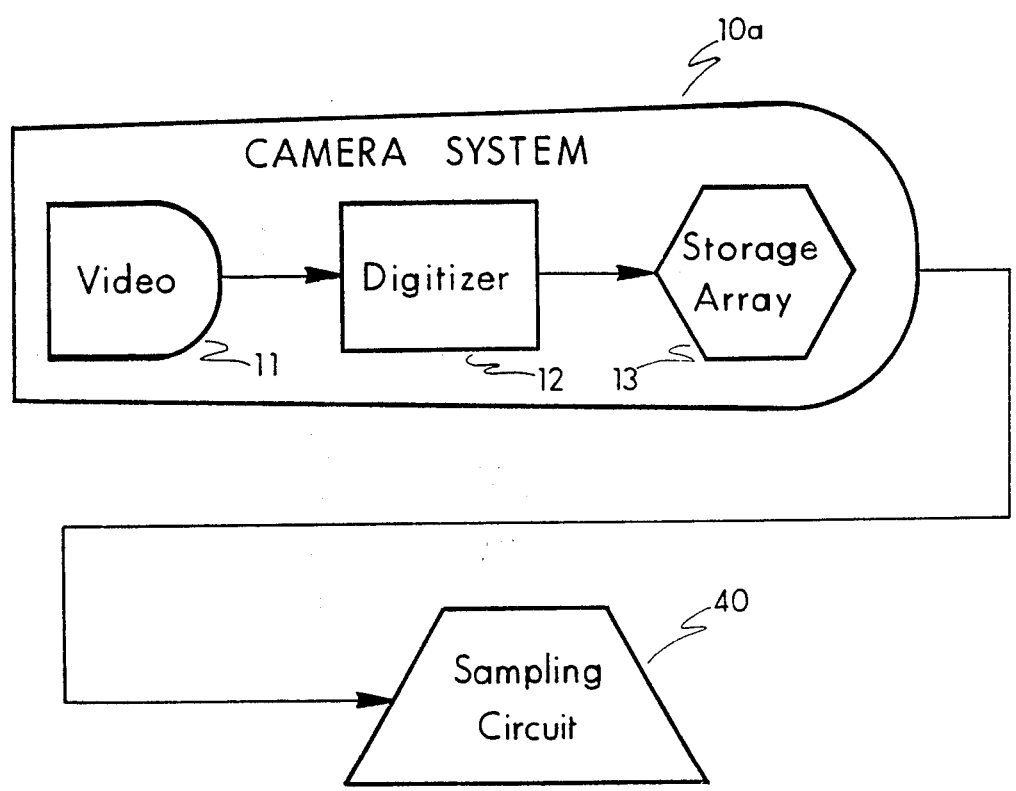

FIG. 15 illustrates that there are separable operations and alternative designs within the camera system.

Figure 16A:
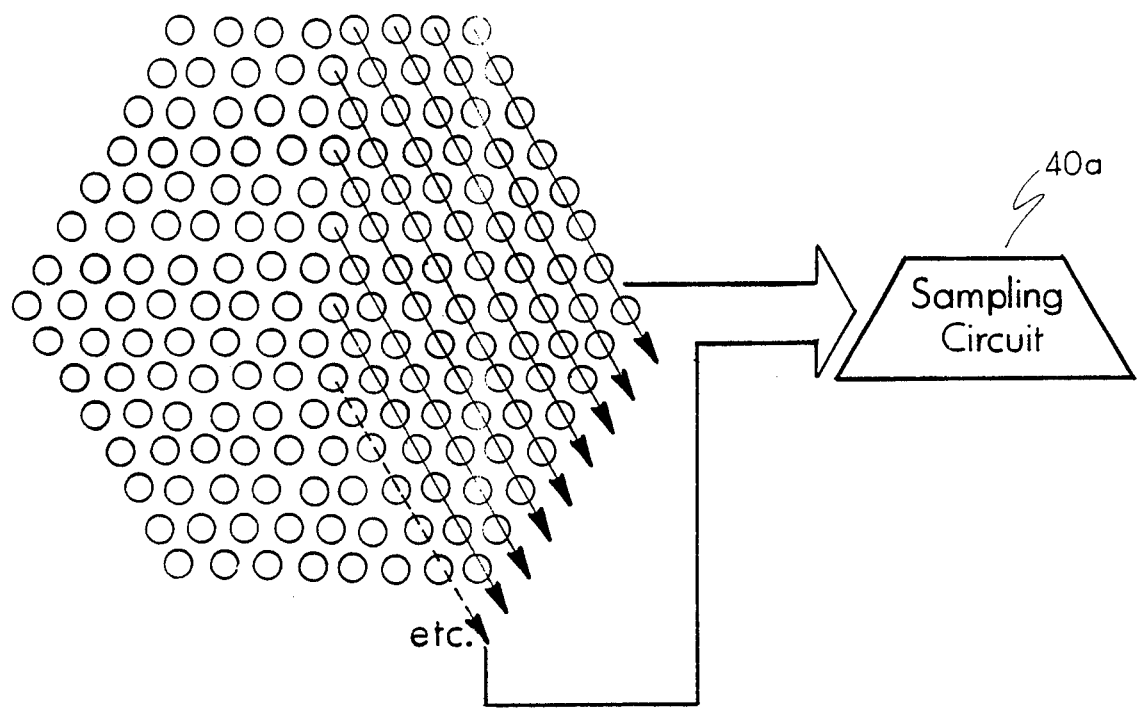
Figure 16B:
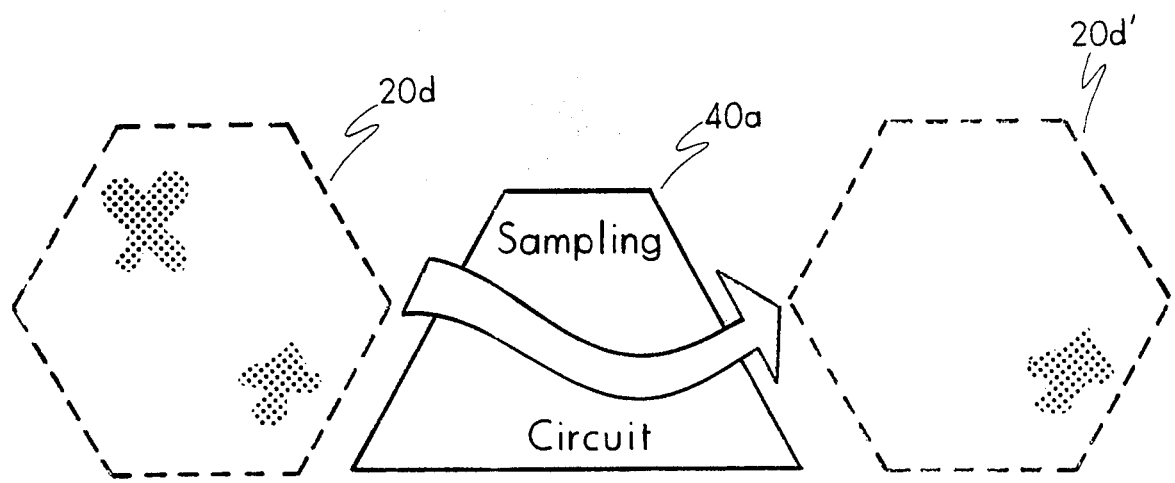

FIGS. 16A and 16B show that selective sampling can be used to restrict analysis of the image.

Figure 17A:
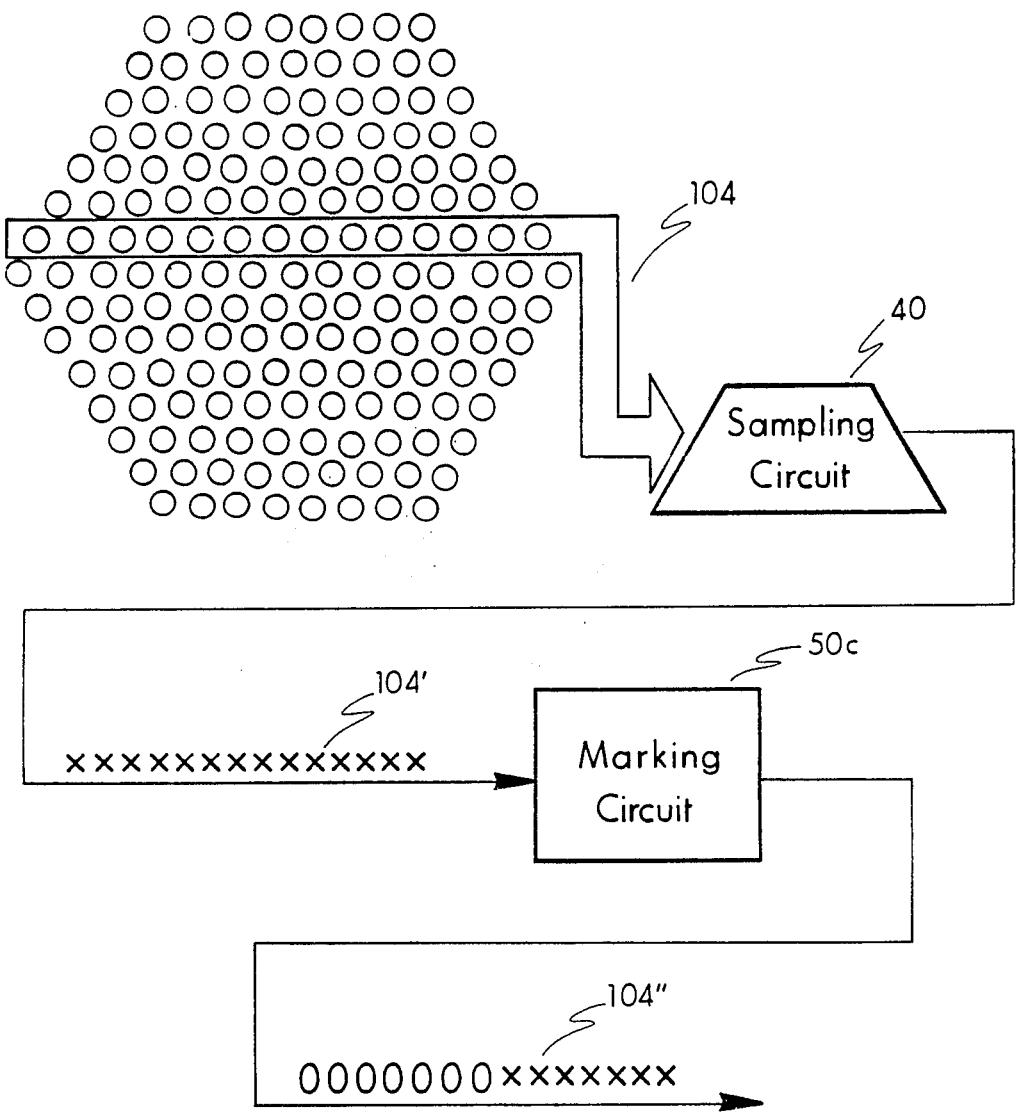
Figure 17B:
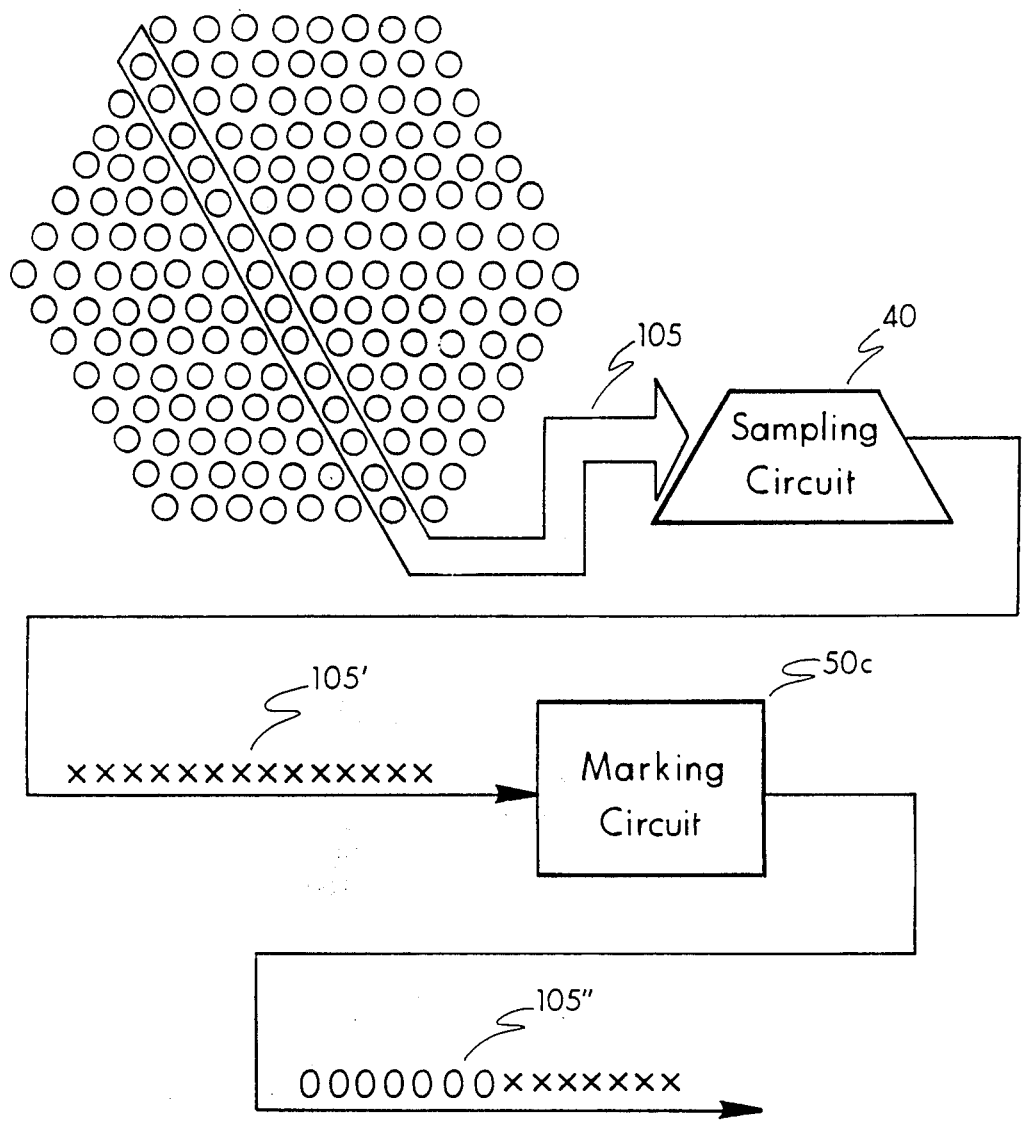

FIGS. 17A and 17B show that predetermined marking (masking) can be used to restrict analysis of the image.

Figure 18A:
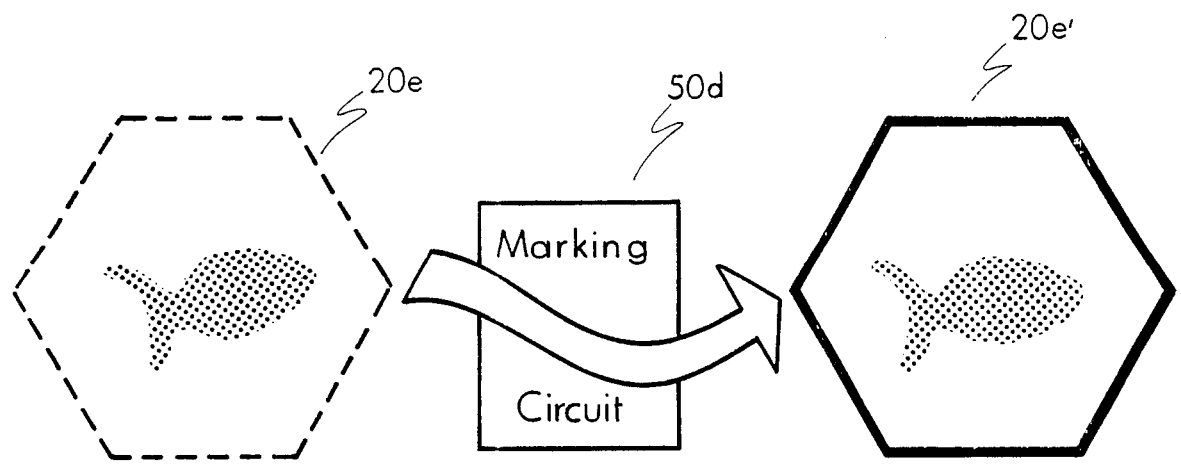
Figure 18B:
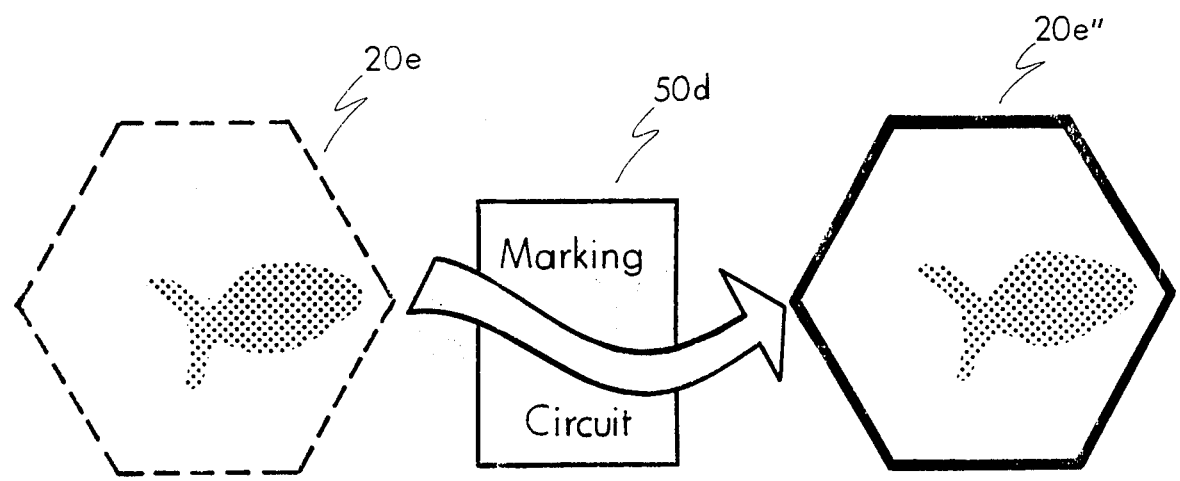

FIGS. 18A and 18B illustrate how location markers can be placed to allow analysis of image position.

Figure 19:
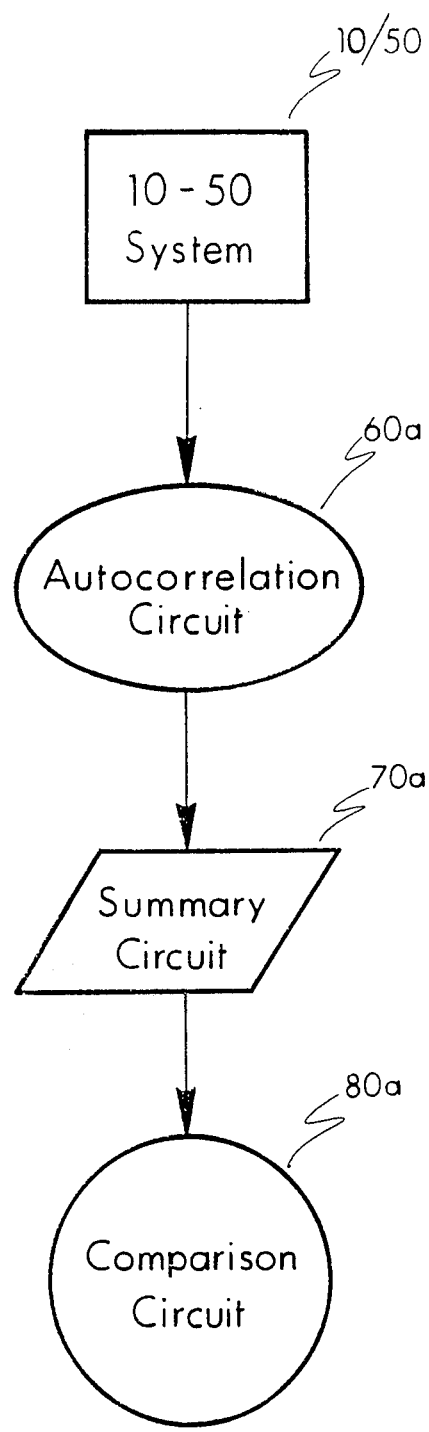

FIG. 19 shows system components to which storage has been added.

FIGS. 20A and 20B illustrate that a computer may be used for encoding and comparison of the summary functions.

Figure 21A:
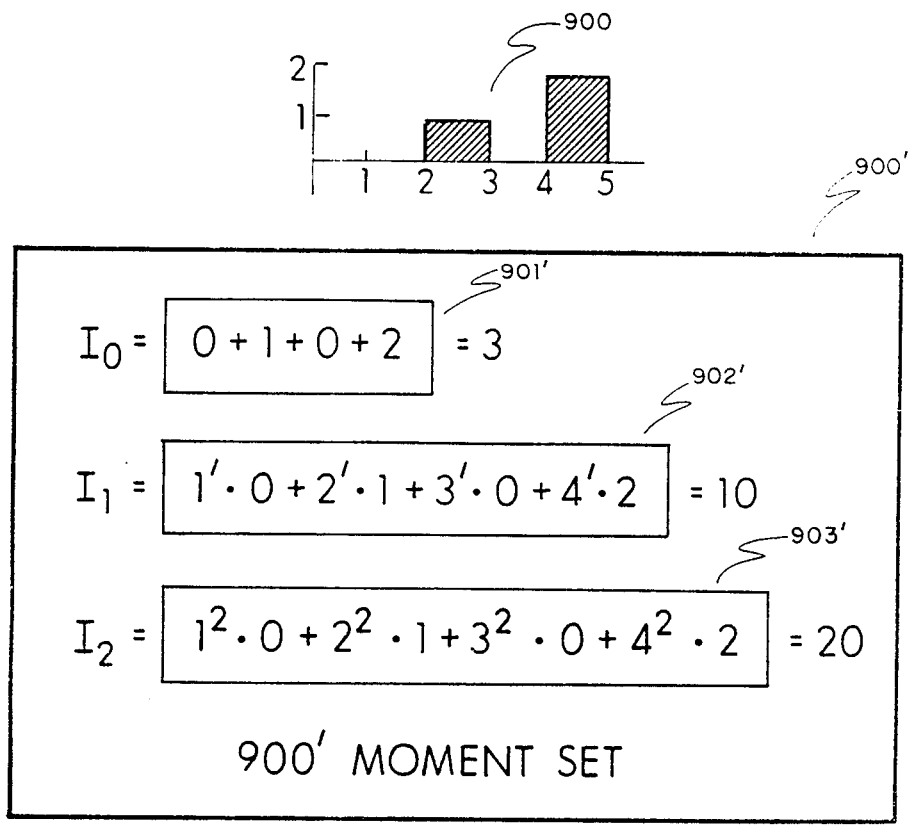
Figure 21B:
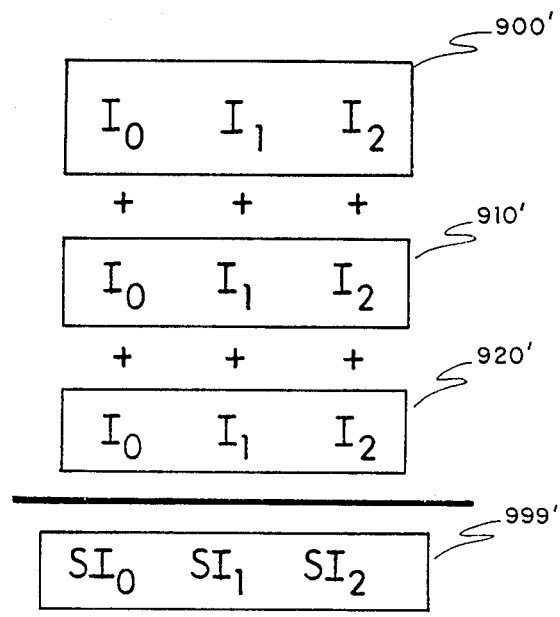

FIGS. 21A and 21B show how moments are calculated and combined.

Figure 22:
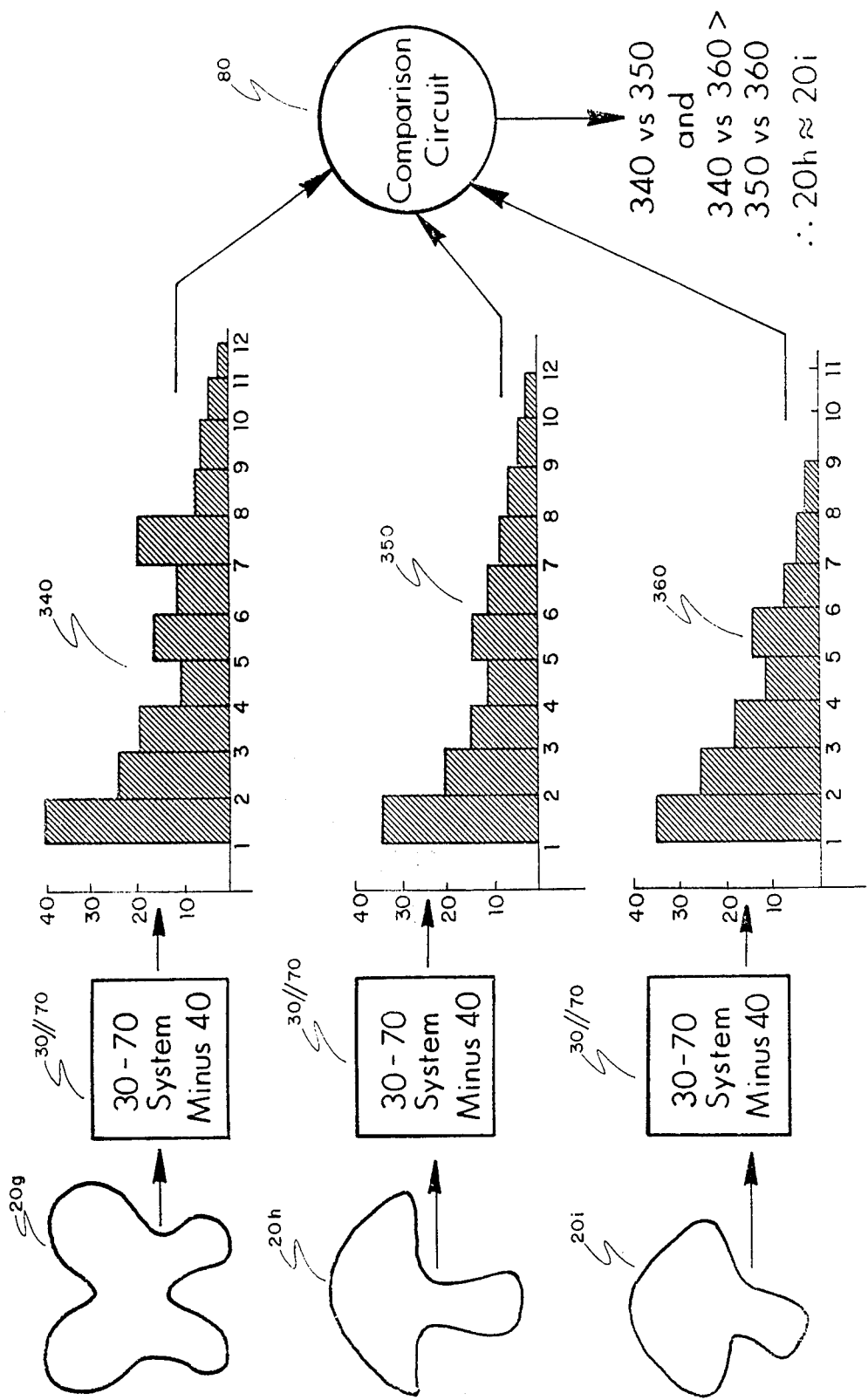

FIG. 22 shows the encoding and comparison process using autocorrelation of raw values from the array.

DRAWING REFERENCE NUMBERS 10 electronic camera
10a camera system with separate digitizing and array components
10x camera designed so array values can be sampled by computer
10y camera with unspecified deficiencies—remedied by computer
10z camera which delivers array values as a temporal sequence
11 basic raster-scan camera
12 digitizing circuit
13 storage array
20 camera image
20a butterfly image
20b mushroom image#1
20c mushroom image#2
20d butterfly+mushroom image
20d' virtual image of mushroom where butterfly has been masked
20e fish image (edge of sensor array shown with dotted lines)
20e' virtual image of marked boundary and centered fish
20e'' virtual image of marked boundary and eccentric fish
20g butterfly line drawing
20h mushroom A line drawing
20i mushroom B line drawing
30 camera value array
30a cartesian array with butterfly pattern
30b hexagonal array with butterfly pattern
40 sampling circuit
40a sampling circuit with capacity for zonal sampling
40y sampling circuit with unspecified computing deficiencies
50 marking circuit
50a signed binary marking logic (E)
50b marking circuit using two's complement (E')
50c marking circuit which sets certain values to zero (masking)
50d marking circuit which places a boundary at edge of array
50y marking circuit with unspecified computing deficiencies
51b inverter for circuit 50b
52b AND gate for circuit 50b
53b exclusive OR gate for circuit 50b
60 autocorrelation circuit
60a autocorrelation circuit with added storage capacity
60y autocorrelation circuit with unspecified computing deficiencies
61 logic of autocorrelation multiplier (M)
61a multiplier designed to received two's complement input (M')
62a exclusive OR for circuit 61a
63a first stage AND gate for circuit 61a
64a second stage AND gate for circuit 61a
65 logic of autocorrelation summation (S)
70 summary circuit
70a summary circuit with added storage capacity
70y summary circuit with unspecified computing deficiencies
80 comparison circuit
80a comparison circuit with added storage capacity
80y comparison circuit with unspecified computing deficiencies
90 general purpose computer with program instructions
100 general cross section of array values
100a cross section containing four array values
102 a horizontal cross section of the hexagonal array
102' sample of values from the 102 cross section
102'' marker sequence from sample 102'
103 a diagonal cross section from the hexagonal array
103' sample of values from the 103 cross section
103'' marker sequence from sample 103'
104 a second horizontal cross section of the hexagonal array
104' sample of values from the 104 cross section
104'' marker sequence from sample 104'
105 a second diagonal cross section of the hexagonal array
105' sample of values from the 105 cross section
105'' marker sequence from sample 105'
202 autocorrelation function for marker sequence 102''
203 autocorrelation function for marker sequence 103''
300 example of how global summary function is derived
310 global summary function derived from image 20a
320 global summary function derived from image 20b
330 global summary function derived from image 20c
340 global summary function derived from image 20g
350 global summary function derived from image 20h
360 global summary function derived from image 20i
500 general set of markers determined by array set 100
500a a general set of markers (array not shown)
500b set of five markers (E set—array not shown)
500c set of transition marking circuits (E' set)
501c $A_0/A_1$ transition marker ($E_0'$)
502c $A_1/A_2$ transition marker ($E_1'$)
503c $A_2/A_3$ transition marker ($E_2'$)
504c $A_3/A_4$ transition marker ($E_3'$)
505c $A_4/A_5$ transition marker ($E_4'$)
600 general set of multipliers
601 multiplier set for E markers lying one space apart (M1 set)
602 multiplier set for E markers lying two apart (M2 set)
603 multiplier set for E markers lying three apart (M3 set)
604 multiplier for E markers lying four spaces apart (M4)
605 multiplier set for E' markers one space apart (M1' set)
605a M1a' multiplier circuit 605b M1b' multiplier circuit
605c M1c' multiplier circuit
605d M1d' multiplier circuit
606 multiplier set for E' markers two spaces apart (M2' set)
606a M2a' multiplier circuit
606b M2b' multiplier circuit
606c M2c' multiplier circuit
607 multiplier set for E' markers three spaces apart (M3' set)
607a M3a' multiplier circuit
607b M3b' multiplier circuit
608 M4' multiplier circuit (also provides S4' value)
700 general set of autocorrelation summators
701 S1 logic element for calculating sum from M1 multipliers
702 S2 logic element for calculating sum from M2 multipliers
703 S3 logic element for calculating sum from M3 multipliers
704 S4 logic element for calculating sum from M4 multiplier(s)
705 S1' adder set
705a a adder for M1a' and M1b' values
705b adder for M1c' and M1a'+b' values
705c adder for M1d' and M1a'+b'+c' values
706 S2' adder set
706a adder for M2a' and M2b' values
706b adder for M2c' and M2a'+b' values
S3' adder (for M3a' and M3b' values)
800 +5 V power supply in series with a resistor
801 AND gate for setting zero at the end of sample sequence
802 shift register for positioning sample values at $Q_A$ and $Q_B$
803 lower shift register for positioning marker digits
804 upper shift register for positioning marker digits
805 lower shift register for positioning marker signs
806 upper shift register for positioning marker signs
807 M1" multiplier for serial circuit
808 M2" multiplier for serial circuit
809 M3" multiplier for serial circuit
810 M4" multiplier for serial circuit
812 S1" adder for serial circuit
813 S2" adder for serial circuit
814 S3" adder for serial circuit
815 S4" adder for serial circuit
820 AND gate to allow serial circuit to begin calculations
10 megahertz oscillator
822 $J\overline{K}$ flip-flop providing a divide-by-two clock
823 $J\overline{K}$ flip-flop providing signal that sample sequence has ended
824 internal timing flip-flop A
825 internal timing flip-flop B
826 internal timing flip-flop C
827 internal timing flip-flop D
828 OR gate to provide clearing signal
829 inverter to provide internal control, and "working" signal
830 binary counter
831 comparator
832 inverter from A>B output of comparator
833 inverter from A<B output of comparator
834 three-input NOR gate
835 inverter providing "send bits" signal
900 hypothetical autocorrelation function
900' moment set for 900 function
901' $I_0$ moment for 900 function
902' $I_1$ moment for 900 function
903' $I_2$ moment for 900 function
910' hypothetical moment set for function not shown
920' hypothetical moment set for second function not shown
999' combined "summary moments" for 900', 910', and 920'
10/50 system containing camera, sampling, and marking circuits
30/70 system containing value array, sampling, marking, autocorrelation, and summary circuits
30//70 system containing value array, sampling, autocorrelation, and summary circuits (no marking)

BRIEF OVERVIEW OF THE INVENTION—FIG. 1

Figure 1:
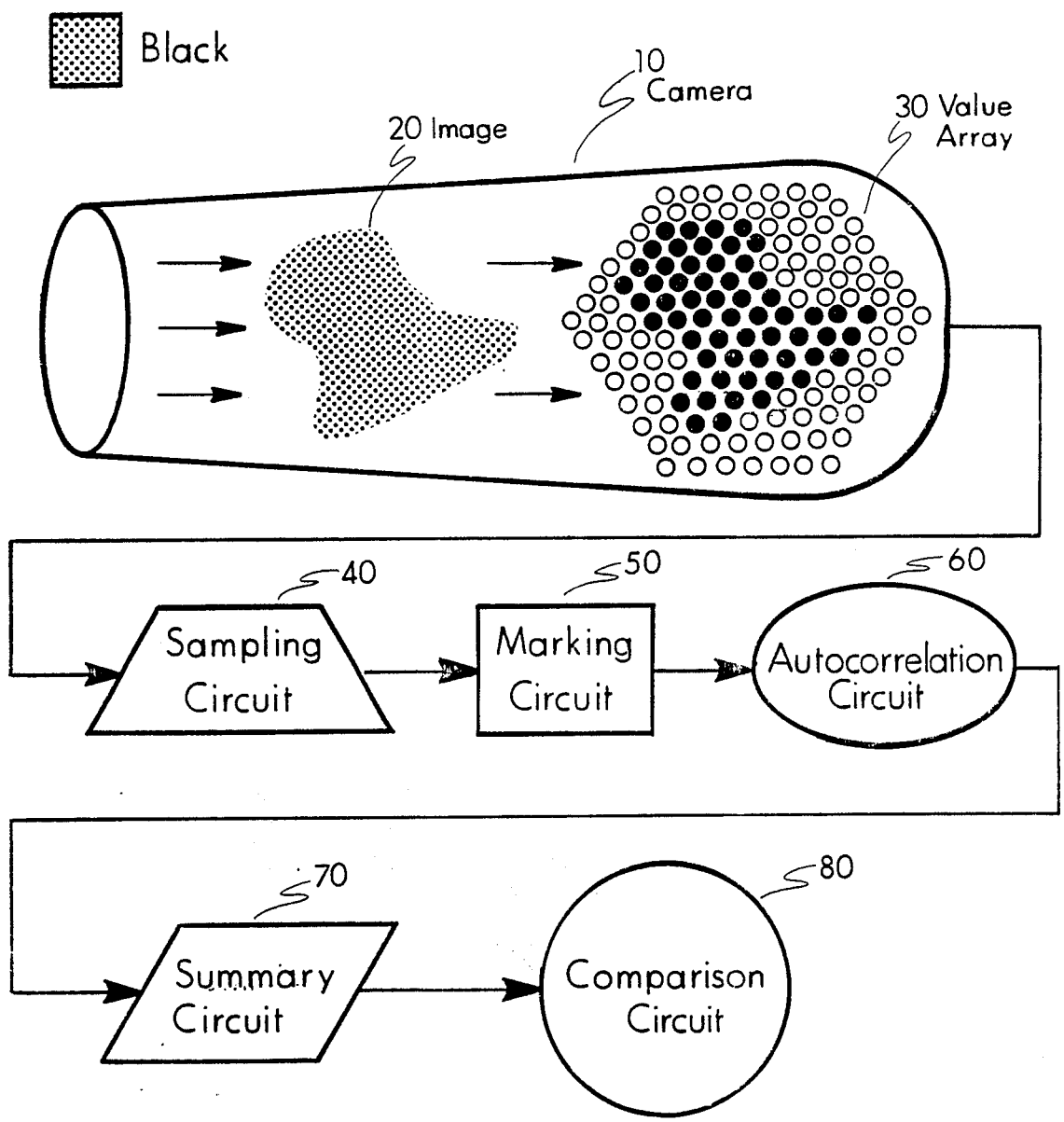
FIG. 1 shows the operational stages of image analysis.

In FIG. 1 the basic elements of the invention are illustrated. They include an electronic camera 10, which contains optical systems for viewing visual shapes and patterns which are external to the camera (not shown), and for forming an optical representation which we will call the "camera image," or simply "image 20." For purposes of illustration, FIG. 1 shows image 20 as an amorphous black form, but the image can have various characteristics as discussed below.

Camera 10 also includes known means for representing the visual characteristics of image 20 by determining or setting the values in an array of elements 30, hereafter called the "value array," or simply "array 30." The individual locations of such an array will be called the "value positions," and the value at each position reflects the brightness, color, or other characteristic of image 20 at that location. (We avoid the term "pixel", since it invites confusion between the location of the value per se, and the specific camera element which generates the value.)

The setting of values may be accomplished in a direct way by focusing image 20 upon a solid-state sensor array. Other designs may require that the selected image characteristic (e.g., brightness) be converted into a time-locked signal, which is then distributed to an array of memory locations. For convenience, we describe the invention as though the values reflected the information in the image at a given moment in time, but this does not preclude averaging, sequential operations, or any other time-dependent method of generating the values in the array.

For any given image, an ordered sequence of values is extracted or otherwise examined by a sampling circuit 40. For most applications, these ordered sequences of values are taken from the natural alignment of columns, rows, and/or diagonals of the array. We use the term "cross section" to describe the aligned positions of the array which provide the values, and the term "sample" may be used to describe the ordered sequence of values.

Each sample of array values is processed by a marking circuit 50. Marking circuit 50 derives further values which reflect "transitions" in the adjacent sample values, as described below. This new sequence may be called a "sequence of transition markers," a "sequence of marker values," or simply the "marker sequence."

This derived sequence of marker values is then processed by an autocorrelation circuit 60. Autocorrelation circuit 60 calculates the product among all possible pairs in the marker sequence, taken at different distances of separation in the sequence. It then sums all products for which the separation is the same, and plots the sum as a function of that distance. This result is called the "autocorrelation function" of the marker sequence.

The autocorrelation function then is passed to a summary circuit 70, which combines the autocorrelation functions derived from the different samples to create a "global summary function" for the array, and thus for the image. The global summary functions for different images are then evaluated by means of a comparison circuit 80, which classifies, compares, or otherwise evaluates the shapes and patterns in these images.

In FIG. 1 the specific example used for image 20 and array 30 are for purposes of illustration. In subsequent descriptions of the invention, these reference numbers (10–80) will be used only to refer to the general component or step in the invention. Examples will be given using a particular variation of design, which will be identified by the addition of a code-letter (e.g. 30a, 50b). Component subsystems will be designated using other numbers in the same decimal block (e.g., 41, 42).

It should also be noted that we have used a distinctive shape to distinguish each of the basic components of the invention. These shapes are used throughout the illustrations to reduce any chance of confusion about the operational step which is under discussion.

The Image

The invention is designed to analyze the patterns and shapes which may be within the view of the camera. For present purposes, the word "image" is used, with the understanding that the component patterns and shapes contained within the image are the subject of analysis. Such components may be designated simply as the "information" of the image.

The registration, sampling, marking, summarizing, and comparison procedures may be accomplished using various kinds of numbers. However, we obtain computational benefits by using integers or binary numbers. We will restrict our examples to the analysis of a simple black and white shape, and to comparison among such shapes. As discussed below, the image will be registered in the array as binary numbers, thus it may also be called a "binary image." Illustration of the invention using binary images is a matter of convenience, since the invention is not restricted to these numbers and images. It may be said, however, that for a variety of applications it is useful first to convert raw images into such binary images prior to analysis. Therefore the procedure we use for purposes of illustration may also have broad utility.

The Value Array—FIG. 2

Camera 10 of FIG. 1 uses known methods to create an electronic representation of the image. It generates values which reflect one or more characteristics of the image, such as brightness, color, or texture. The camera converts these attributes into electronic values for the adjacent locations across the surface of the image. The invention requires that the adjacent locations be organized as an "array," that is, a group of elements having a regular spacing and alignment.

Figure 2A:
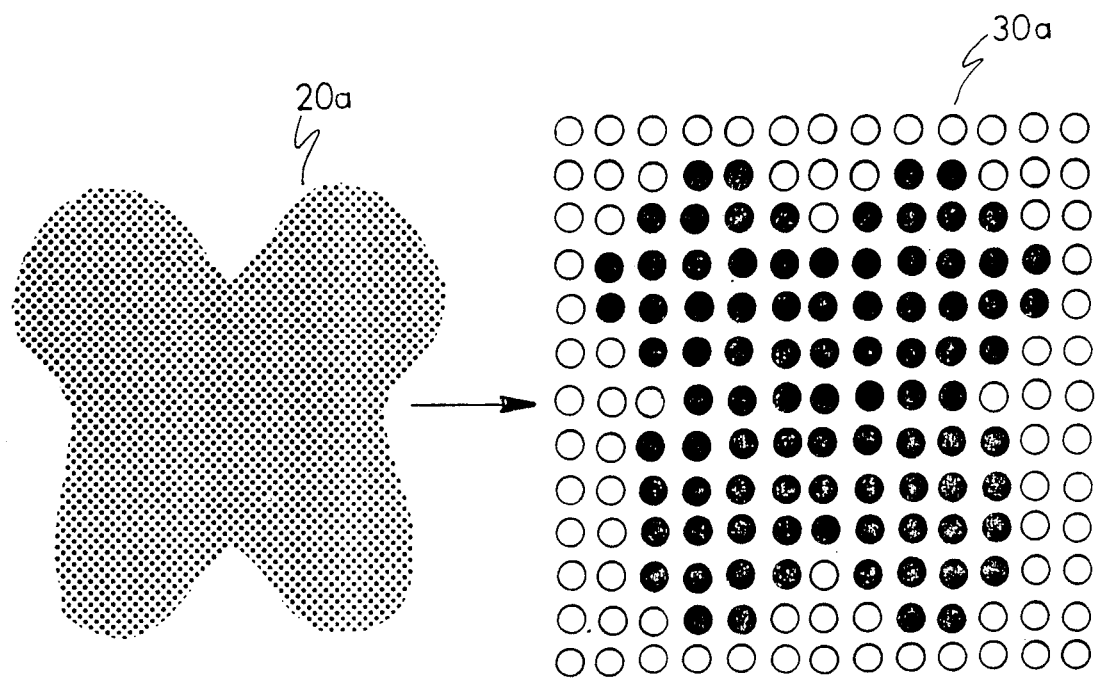
FIGS. 2A and 2B show two examples of how the image may be represented by an array of values.

FIG. 2A shows an image 20a being registered to produce a two-axis (Cartesian) array 30a. In this example the brightness level at adjacent points in the image has been converted electronically into 0s and 1s, and the values of the 0s and 1s illustrated using hollow and filled dots, respectively. It should be noted that the reference number (i.e., 30a) refers to the specific array of values which corresponds to a specific image (and in our examples, at a specific moment in time). If the image shape is displaced slightly with regard to the array, the values at certain locations will change, and by our labeling convention, a different reference number (such as 30a') will be used.

Figure 2B:
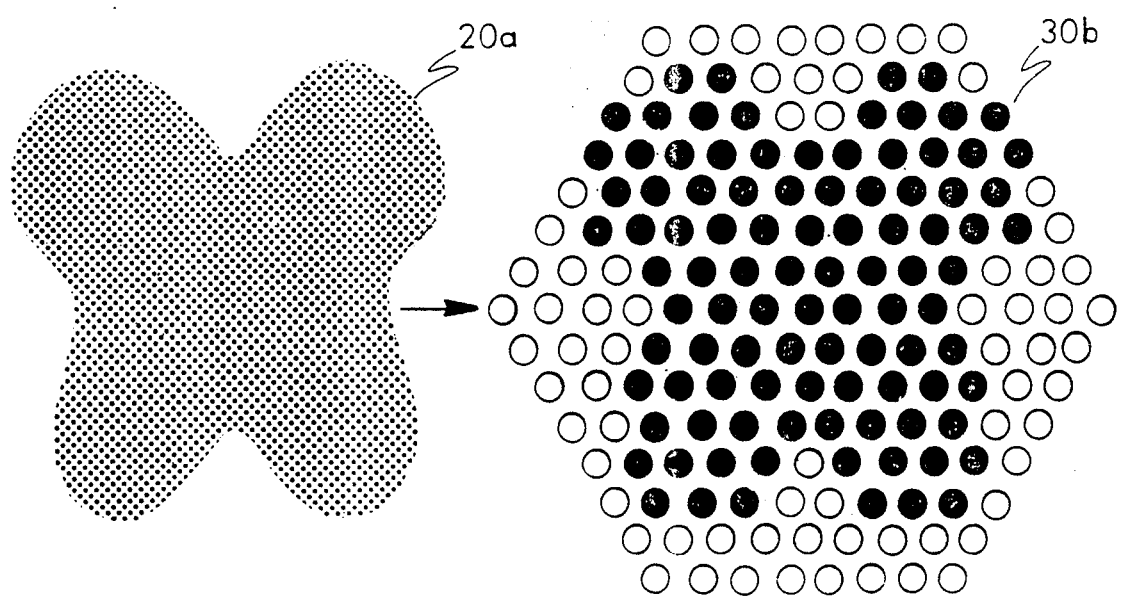

FIG. 2B shows a three-axis (hexagonal) array 30b, in which the hollow and filled dots are again used to represent the electronic equivalent of the 0s and 1s Hexagonal arrays have the advantage that the array values (i.e., the dots in this example) form straight diagonals in three directions. This design has certain advantages, especially the fact that the spacing among array values is equal in each direction, which makes it possible to combine subsequent calculations without special correction.

Sampling An Ordered Sequence of Values—FIG. 3

Figure 3A:
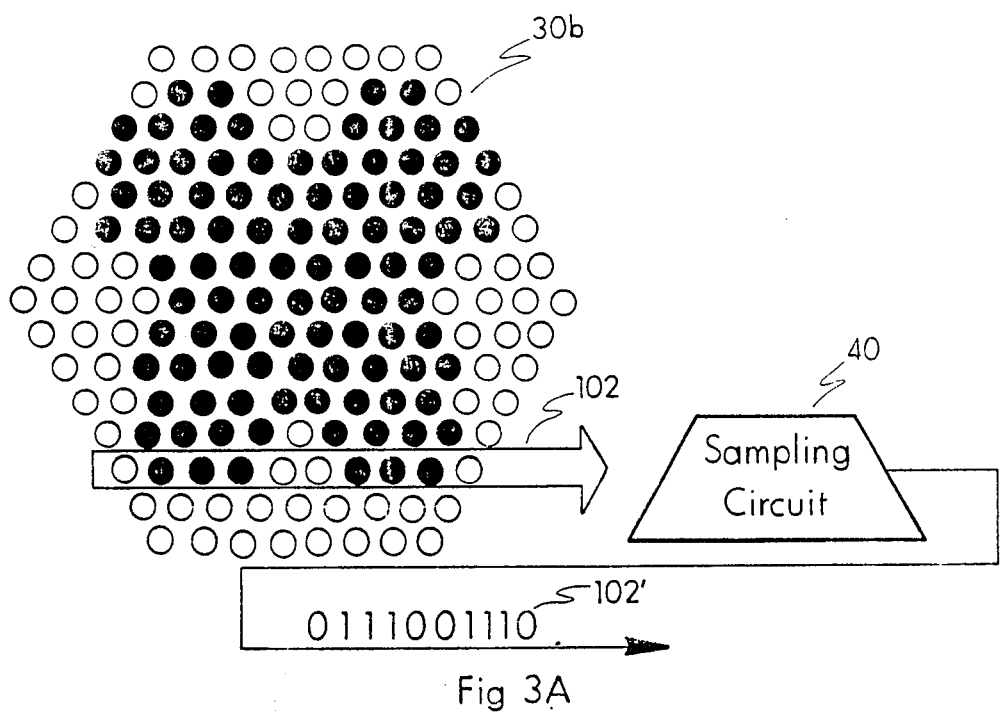
FIGS. 3A and 3B show the sampling of values from the array.

Sampling circuit 40 uses direct wiring, or other standard procedures for value extraction to determine the values of an ordered sequence (the sample). As shown in FIG. 3, a given sample will be taken from one set of aligned locations of the array. We refer to the aligned locations, in this case the diagonals, as the "cross sections" of the array. FIG. 3A shows the values in array 30b being sampled from a horizontal line—i.e., cross section 102. The sequence of electronic values in the cross section is "extracted" or otherwise used to determine the subsequent encoding operations, as discussed below. We illustrate the sampling process by showing a string of corresponding 0s and 1s being delivered out of circuit 40 as sample 102'.

Figure 3B:
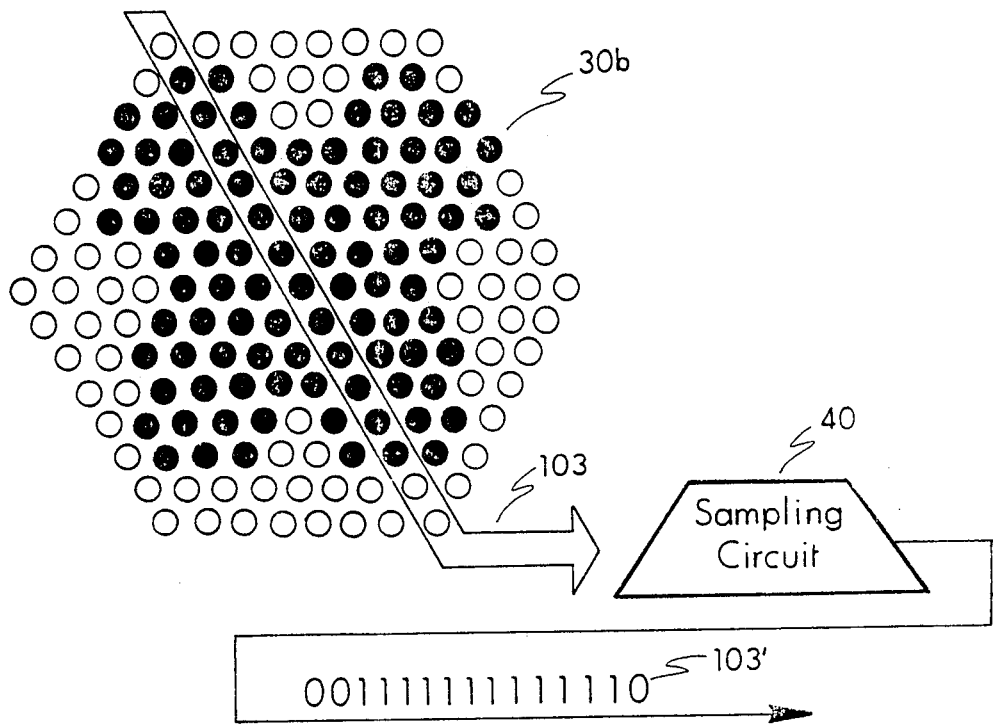

FIG. 3B shows the sampling of hexagonal array 30b along one of its diagonal cross sections. The values of cross section 103 are used to derive sample 103'.

The sample consists of an ordered set (a sequence) of array values, and for most applications we use a natural cross section (e.g., a column, row, or diagonal). More generally, we can sample any predetermined ordered sequence of entries of the array; the invention has no intrinsic requirement that the values lie along a straight line in the array.

The particular hardware or system used may require that the sample be "extracted" as a temporal sequence (i.e., a time-ordered signal). Alternatively, a "logic tree" may be wired to sense and deliver the values in the cross section in parallel over the wires. Or the sampling and transition marking steps (discussed below) may be done as a combined process, for example by sampling values from the array two at a time to generate the marker sequence directly. For convenience we have illustrated the sampling process as though the values were extracted as a temporal signal, but it should be clear that the determination of the ordered set of values (as needed for subsequent encoding steps), may be accomplished in other ways.

Depending on circuit design and application, the sampling may be destructive or non-destructive to the values contained in the array. Nondestructive sampling allows successive samples to be taken across several axes, which is useful when the results are combined into a summary of the image, as will be described below.

Deriving the Sequence of Transition Markers—FIG. 4

Various kinds of encoding will prove useful. We illustrate the general process using a method which marks transitions between areas of light and dark in the binary image. The continuity of light or dark zones in the image is reflected in the strings of 0s and 1s in the samples derived from the image. One can effectively "mark" the location of image boundaries by examining adjacent pairs of values from the sample, and setting markers to indicate when the values are alike or different.

Figure 4A:
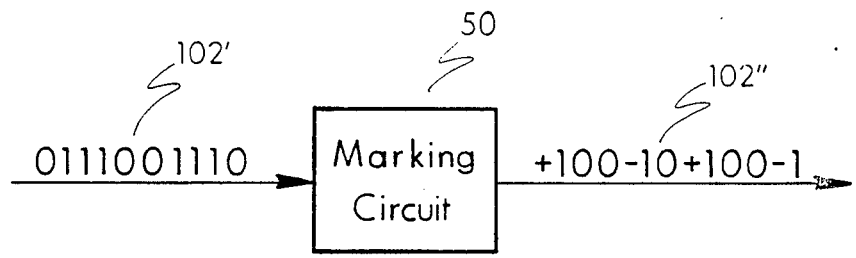
FIGS. 4A and 4B show the marking of transitions in the sample of values.

FIG. 4A shows how the markers are set for sample 102'. In this example, signed (+ or −) binary numbers are used to mark the differences in adjacent values of the sample. If an adjacent pair in the sample has the same value, then a 0 is generated in the marker sequence. If the pair values are 0,1 (reading from left to right), then a +1 marker value is produced, and if the pair values are 1,0, then a −1 marker is produced. (If the sample begins or ends with a 1, then a 0 is placed at the end of the sample to provide the 1 with a pair member. In formal nomenclature and circuit design, 0s are automatically added to each end of the sample.)

Thus it can be seen how the pattern of values in 102' determines the values in marker sequence 102''. It can be helpful to think of the process as one of marking the "edges" of the string of sample values. Thus, in 102'' a +1 is set at the beginning of each string of ones, and a −1 is placed at the end of each string.

Figure 4B:
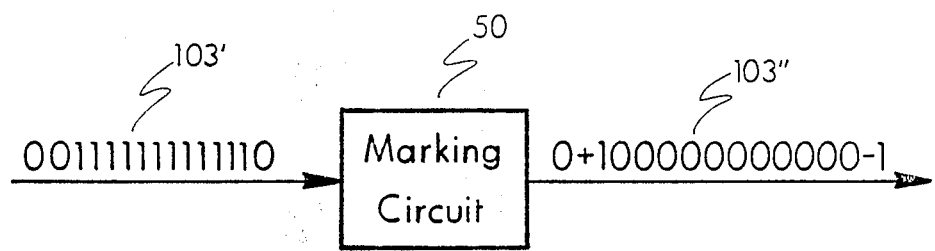

FIG. 4B shows marker sequence 103'' which has been derived from sample 103'. In this case there is only one string of 1s and thus a single pair of markers (+1 and −1) is needed to indicate the "edges" of the string.

More formally, the sample values are designated by the sequence of numbers $A_1, A_2, \ldots A_k$. We set $A_0=0$ and $A_{k+1}=0$, and define the sequence of marker values $E_i$ (for $i=0, 1, 2, \ldots, k$) by the relation $E_i=A_{i+1}-A_i$ (that is, the algebraic difference between successive entries in the sample, subtracted in reverse order).

We have used signed binary markers, after considering the mathematical concept of a "bimeasure," which specifies the additive relationships among elements taken two at a time. We have found that there are values which need to be cancelled in order for this additive relationship to hold. This requires the use of "−" as well as "+" markers.

Calculating the Autocorrelation Function—FIG. 5

Each encoded sample is passed to the autocorrelation circuit 60, which calculates the "autocorrelation function" of the marker sequence. The logical representation of this calculation is as follows:

$$S(n) = -(E_0 E_n + E_1 E_{n-1} + E_2 E_{n-2} + \ldots E_{k-n} E_k),$$

where $E_0, E_1, \ldots E_k$ are the ordered marker values in the sequence. This is the sum of the products of all marker values that are separated by n steps, where n is a variable ranging from 1 to k. By convention, we choose to plot the product of the most distant markers as a positive value. These markers always have the value of +1 and −1, with a product of −1. Therefore it is necessary to reverse all signs, which is done most easily by reversing the sign on the final product sum, as indicated in the formula given above.

Figure 5A:
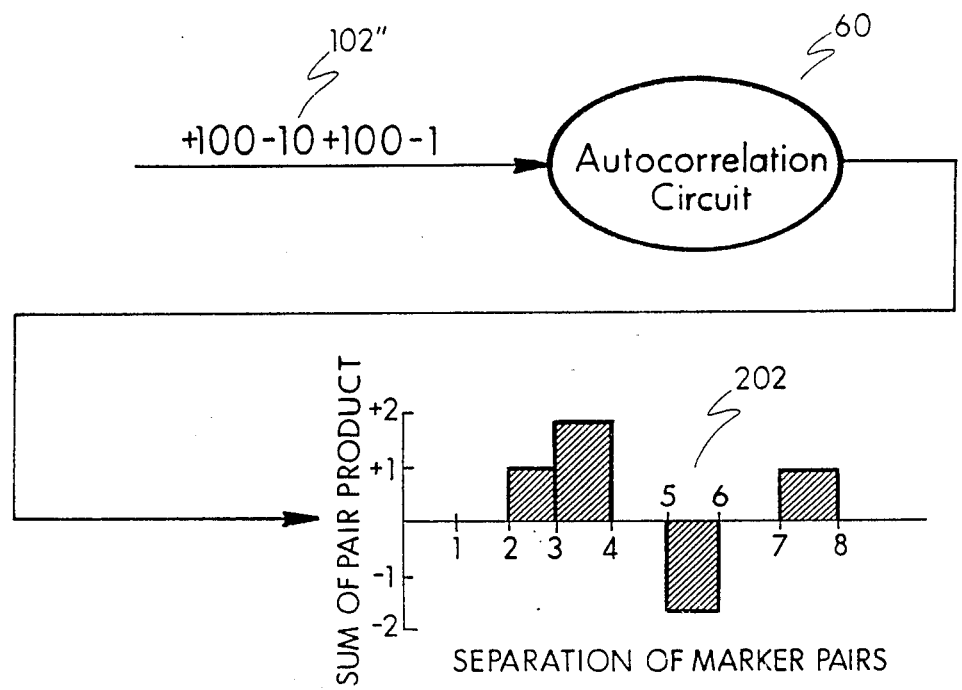
FIGS. 5A and 5B show the autocorrelation of marker values, and plotting the results as an autocorrelation function.

For the computer, the calculation of the sum can be written in Basic language as:
For n=1 to k
For i=0 to k−n
$S_{(n)}=S_{(n)}-E_i^* E_{i+n}$ FIG. 5A shows an autocorrelation function 202, which is created by applying the computational formula to marker sequence 102''. The autocorrelation function is essentially a histogram plot of the cross-products of all possible pairs of markers (reversing the sign of the final sum), plotted as a function of all possible distances between pairs of markers. Thus, in encoded sample 102'', there is one set of markers which lie two spaces apart, two that lie three spaces apart, etc. Taking the signs into account, these cross-products can be plotted in the form of a histogram—i.e., autocorrelation function 202.

Figure 5B:
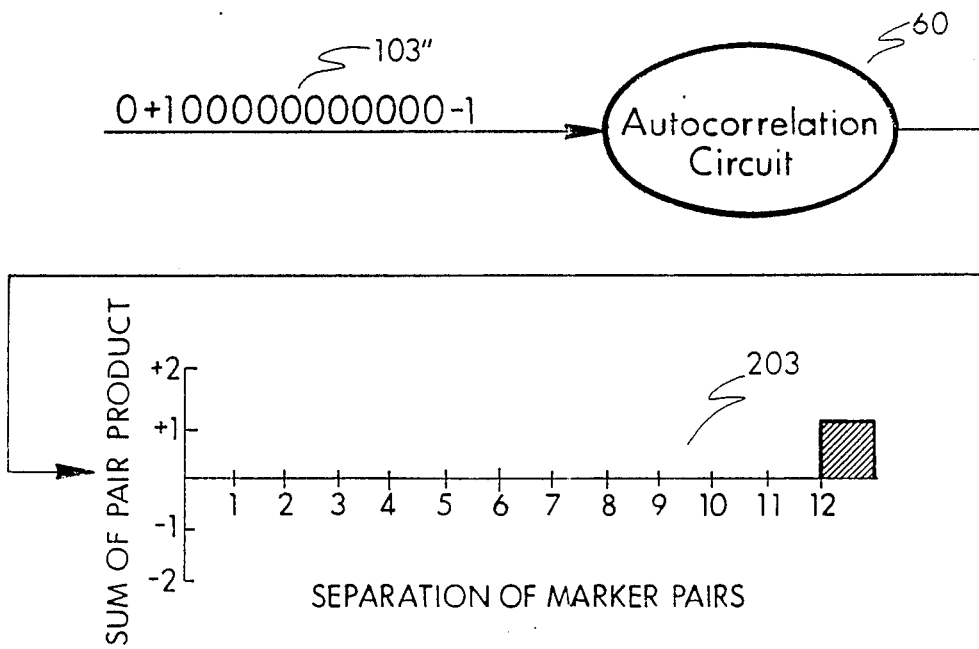

FIG. 5B shows an autocorrelation function 203 which is derived from marker sequence 103''. The histogram contains only one value at 12, reflecting the fact that marker sequence 103'' has but a single pair of markers which lie twelve spaces apart.

Figure 6:
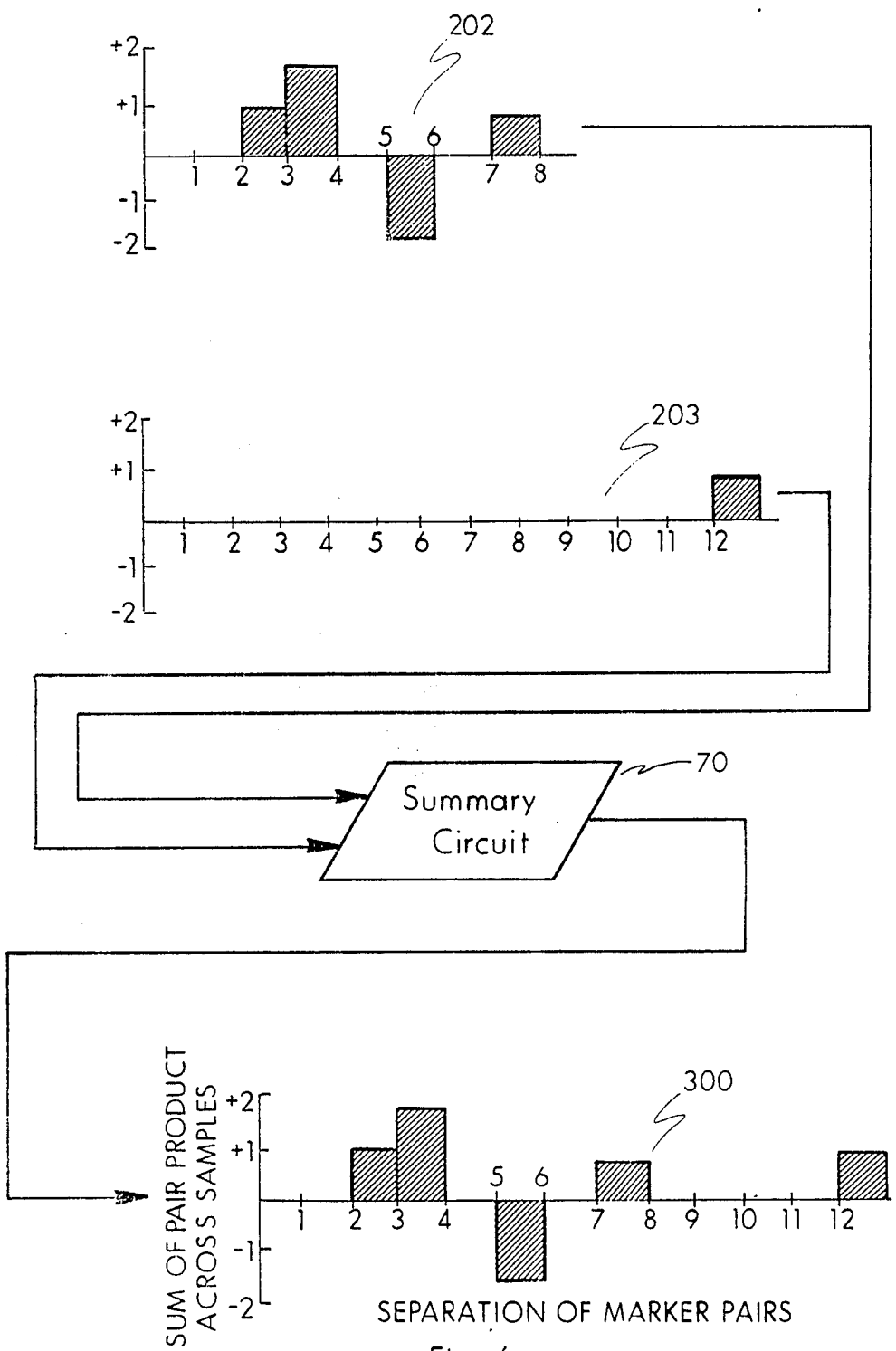
FIG. 6 shows the combining of autocorrelation functions into a global summary function.

Combining Autocorrelations into Global Summary Function—FIG. 6

After the autocorrelation function is calculated for the cross section, it is passed to summary circuit 70. Given a predetermined set of cross sections, the autocorrelation functions for each cross section in the set will be passed to circuit 70. These autocorrelation functions then can be combined in various ways.

If there are m cross sections measured by autocorrelation functions $S_1(n), S_2(n), \ldots S_m(n)$, then the most standard combination is simply their sum:

$$P(n) = S_1(n) + S_2(n) + \ldots S_m(n)$$

FIG. 6 illustrates the summation process, with autocorrelation functions 202 and 203 being combined to produce a "global summary function" 300. For each value of n, the values in the contributing functions are simply added and plotted in summary function 300 at that value of n. Thus the values in autocorrelation function 202 (shown at 2, 3, 5, and 7 in the histogram) are added to the values contained in autocorrelation function 203 (the single pulse at 12).

Global summary function 300 has been created by adding the autocorrelation functions derived from only two cross sections of the array. As a limiting case, calculating the summary function for an image might be done using the autocorrelation from a single cross section. In such a case the sample set (of cross sections) has only one member, so that the autocorrelation function and global summary function are identical.

In practical terms, global summary function 300 is an extremely restricted sample of the image, and one would not expect such a summary function to be effective for recognition or comparison among images. In most applications, all the natural cross sections of the image would be sampled, autocorrelated, and combined to produce the global summary function. Thus, for the hexagonal array, one would sample all diagonals in three directions. Subsequent discussions of the comparison process will assume that the global summary function has been derived in this way.

Instead of summing the autocorrelation functions, it is possible to use the average, the product, or any other algebraic combination of the histogram values. Each may have special benefits depending on application. For example, the average takes into account the number of autocorrelation functions which were contributed. If the number of cross sections is not equal for each shape being analyzed, the average of the autocorrelations functions will be more useful than the simple sum.

Figure 7:
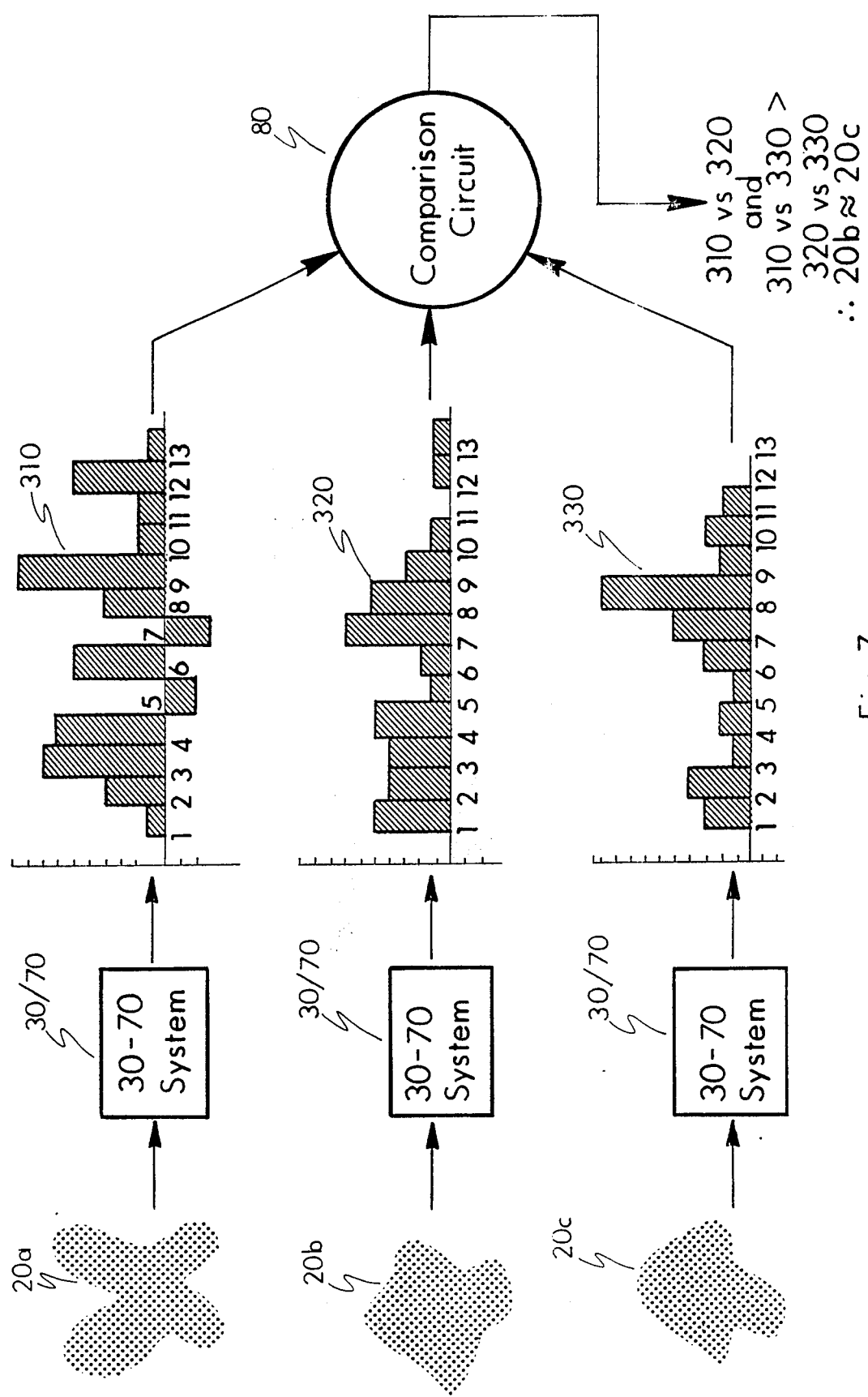
FIG. 7 shows the global summary functions derived from three images, and judgment of thier similarity.

Algebraic Comparison of Global Summary Functions—FIG. 7

The global summary function is passed to comparison circuit 80. Circuit 80 is designed to compare several global summary functions which have been derived from respective images, or from the components of an image. FIG. 7 shows images 20a, 20b, and 20c, each of which has determined the binary values in corresponding hexagonal arrays (as illustrated in FIG. 2B). Sampling circuit 40 (FIG. 4) has sampled cross sections of the array to determine the values produced by each image, and marking circuit 50 has marked the transition between light and dark areas (as indicated by the strings of 0s and 1s). Circuit 60 (FIG. 5) has calculated the autocorrelation function for each marker sequence, and summary circuit 70 (FIG. 6) has combined them to produce a global summary function for each image. These operations are represented by a single system block, designated as system 30/70 in FIG. 7. System 30/70 has yielded a global summary function 310 corresponding to image 20a, a function 320 corresponding to image 20b, and a function 330 corresponding to image 20c.

At this step we can determine, for example, whether image 20c is more like image 20a or image 20b. Operationally, the relatively similarity is judged by comparing the global summary functions which have been derived from the three images. One of the simplest methods of reaching a decision is to compare the absolute difference or the mean square difference among the histogram combinations. Formally, (a) The mean square difference is the quantity:

$$\sqrt{\sum_{n=1}^{\infty} [P_1(n) - P_1(n)]^2}$$

(b) The absolute difference is the quantity:

$$\sum_{n=1}^{\infty} |H_1(n) - H_2(n)|$$

where $P_1$ and $P_2$ are the global summary functions of two images, and $H_1$ and $H_2$ are their corresponding accumulations, based on the formula:

$$H_i(n) = \sum_{k=1}^{n} P_i(k) \text{ (for } i = 1, 2\text{)}.$$

We have found the cumulative form of the histogram to be more useful than the raw histogram values when using the absolute difference method.

With either procedure, the smaller the calculated difference, the greater the similarity of the global summary functions.

In the example given in FIG. 7, the mean square difference derived by comparing histograms 330 and 320 is smaller than that derived by comparison of 330 and 310. Thus, using the definition of "similarity" described above, image 20c is more like image 20b than 20a. This corresponds to our intuitive perceptual judgments.

Transition Marking Logic—FIG. 8

Figure 8A:
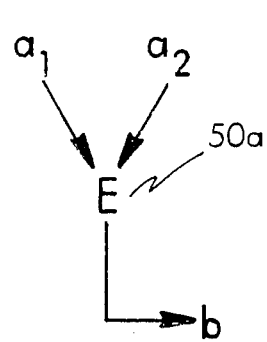
FIGS. 8A and 8B show the logical basis for marking transitions.

We have described the marking of transitions using signed binary numbers. FIG. 8A shows the general design for the logic elements which determine what values of markers to set. Marking logic element 50a is designed to receive two input values, and to deliver a third value as indicated in the truth table.

Figure 8B:
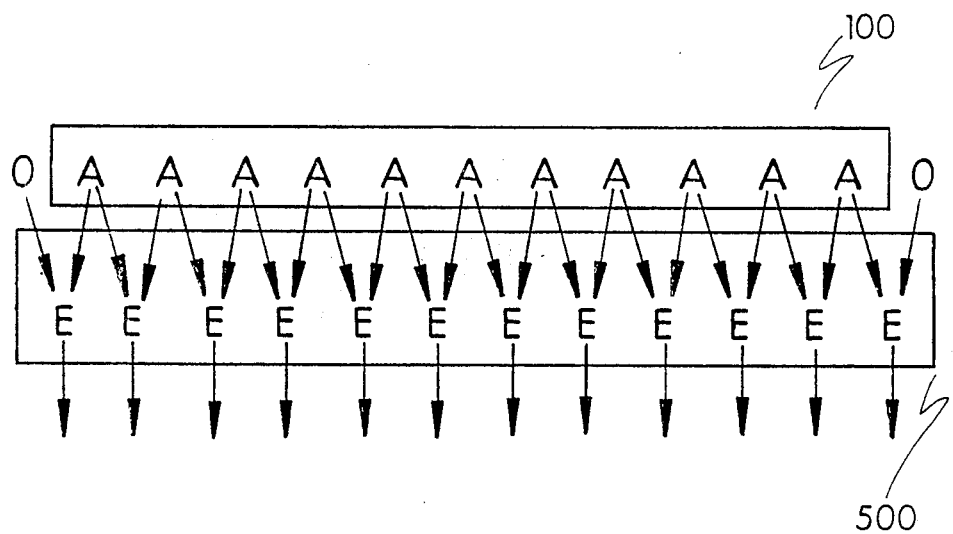

FIG. 8B shows the arrangement of parallel connections to generate the marker sequence directly from the sample of array values. The array sample 100 is connected in pairs to a marking logic set 500. An additional zero is supplied to the logic element at each end of the set. Output from marking logic set 500 provides the sequence of transition markers which corresponds to the values contained in array sample 100.

Autocorrelation Logic—FIG. 9

The logic elements needed for autocorrelation require that values be multiplied, and then the products must be summed. FIG. 9A shows multiplier element 61, which receives two values as inputs, and delivers an output which is the product of the values. FIG. 9B shows summation element 65, which receives a set of values as inputs, and provides an output which is the sum of the input set. Note that neither logic element requires that the values be binary. While we continue to provide examples of the process using binary and signed binary numbers, the autocorrelation process is not restricted to such numbers.

FIG. 9C illustrates connections from a marker sequence into sets of multipliers and summation elements as would be needed for parallel computation of the autocorrelation function. The general format of pairings among markers is shown as set 500a. Similarly, the general set of multipliers which are required for calculating the autocorrelation are shown as set 600, and the summation elements needed to add these products is shown as set 700. It should be noted that these summation elements are components of autocorrelation circuit 60. Summation of multiplier cross-products is an essential step in the calculation of the autocorrelation function—the summary of information from a single cross section of the array. This process should not be confused with the subsequent operation for summing the autocorrelation functions to produce a global summary function.

Details about the general organization of elements, and the cascade of information is best illustrated with a small set of sequence markers, as discussed below.

Illustration of How Logic Elements May Be Organized—FIG. 10

When the number of values in the sample is k, the number of values in the marker sequence is k+1, the number of multipliers is k(k−1)/2, and the number of summation elements needed to store the values of the autocorrelation function is k.

FIG. 10 shows the design of a parallel logic network in which there are four values (not illustrated) in the array sample, and five values in the marker sequence. FIG. 10A shows marking logic set 500b, which provides the values in the marker sequence. Each element in set 500b is wired to adjacent members of multiplier set 601. Since this set of four multipliers calculates the products of all marker values which lie one space apart, we designate it as the M1 set.

Figure 10A:
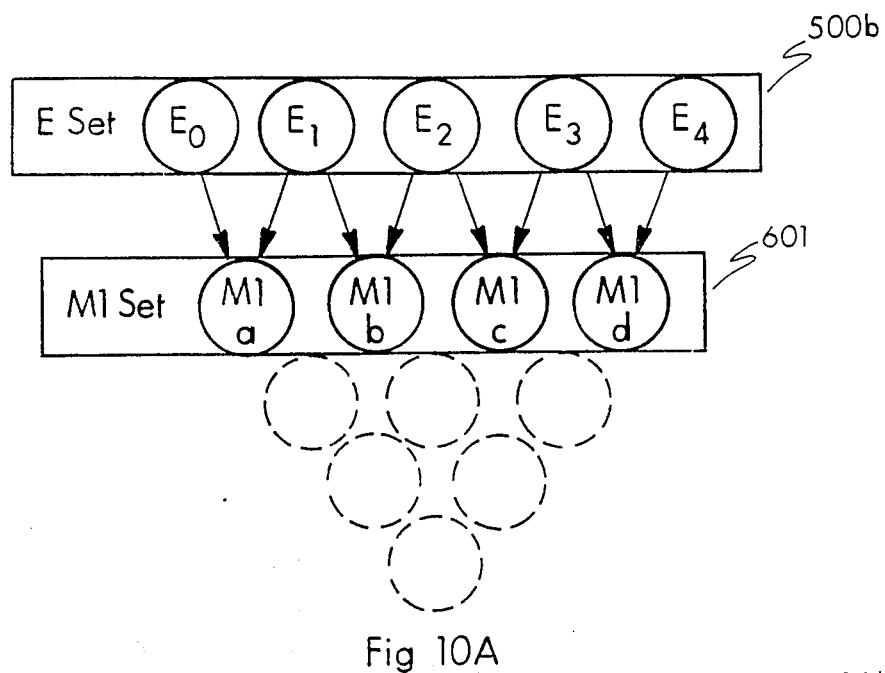
Figure 10B:
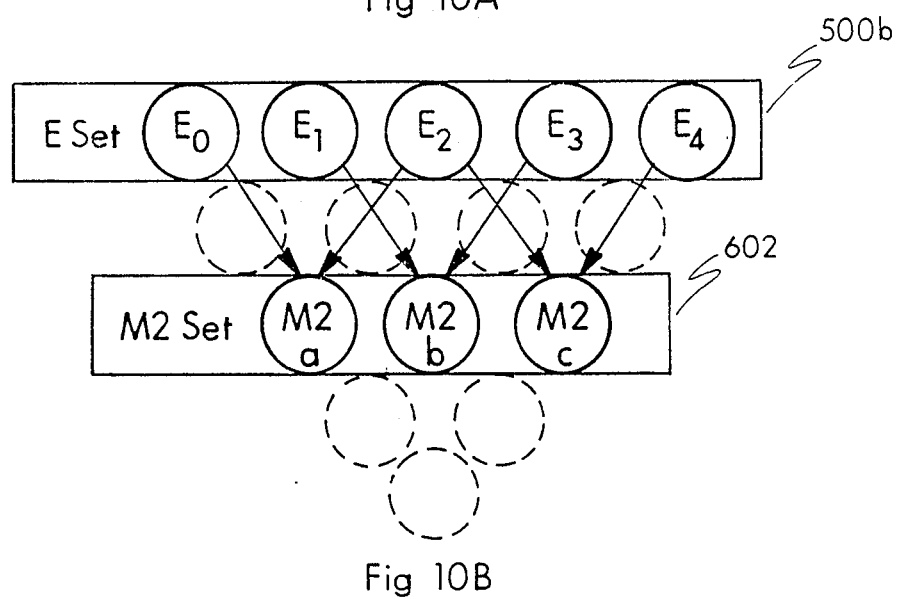

FIG. 10B shows the connections from marking logic set 500b into multiplier set 602 (the M2 multipliers which calculate products among markers that lie two spaces apart).

Figure 10C:
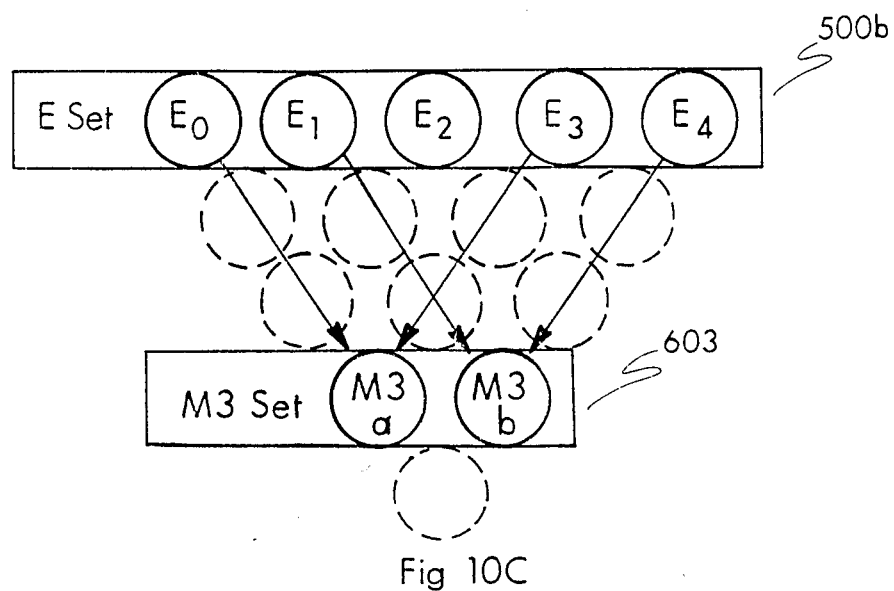
Figure 10D:
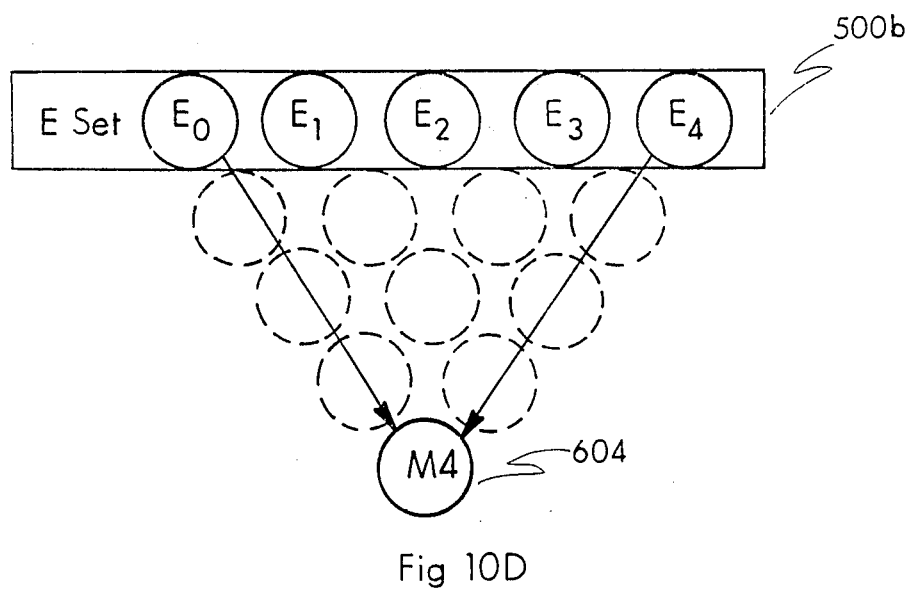

FIG. 10C shows multiplier set 603 (the M3 set), and FIG. 10D shows the single multiplier 604 (M4) which multiplies any markers values lying four spaces apart.

Figure 10E:
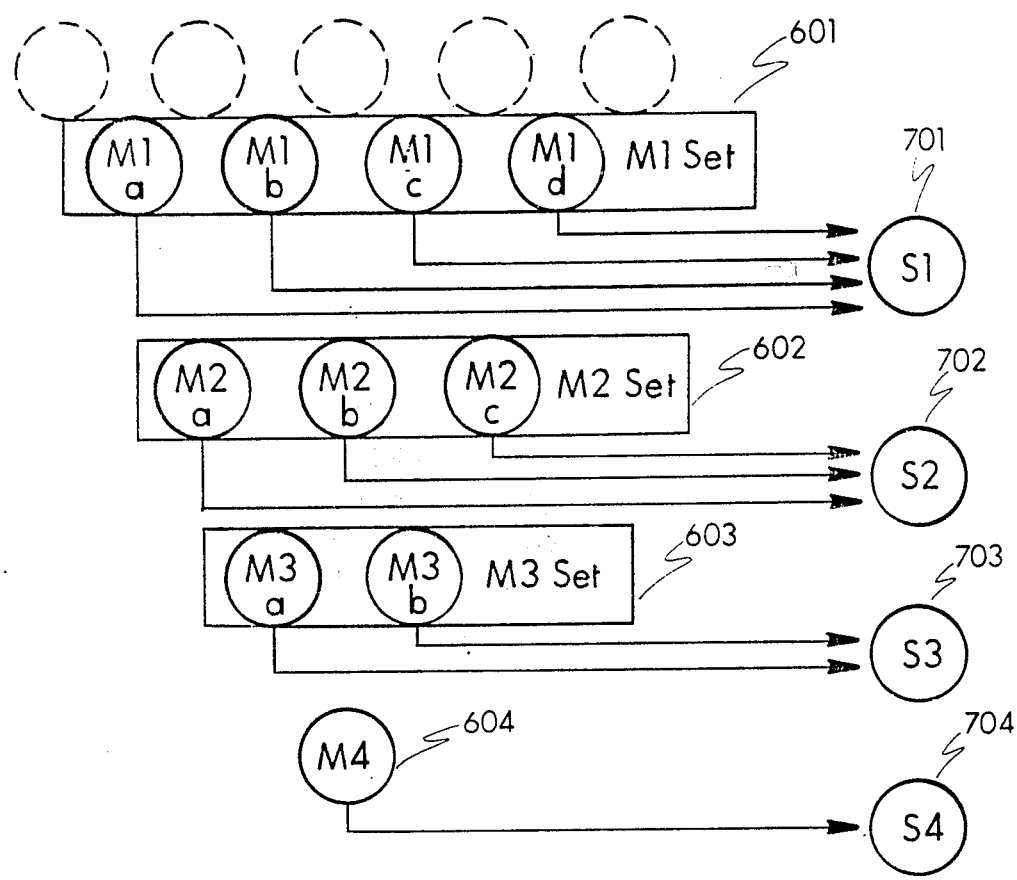

FIG. 10E illustrates the relationship among the multiplier sets and the summation elements. Multiplier set 601 provides four lines of input to summation element 701 (which we also call the S1 summator). Multiplier set 602 provides three lines of input into summation element 702 (S2); multiplier set 603 provides two lines into summation element 703 (S3), and multiplier 604 provides input into summation element 704. Summation element 704 has been shown to provide completeness to the schematic diagram. In fact, no summation of M4 output is needed, and so the value delivered by the M4 multiplier is equivalent to the S4 value.

Circuit Element for Setting Markers—FIG. 11

A simple electronic circuit for setting transition markers is shown in FIG. 11. With respect to binary numbers, marking circuit element 50b is the operational equivalent of marking logic element 50a (FIG. 8A), and is called the E' circuit. Input to marking circuit 50b is provided by the binary array values $A_i$ and $A_j$, and it generates two output values $S_k$ and $D_k$ which are a coded equivalent of signed binary numbers. We have encoded the sign of the number using a "two's complement" representation, as shown in the truth table. In this coding convention, the sign of the binary number is indicated by a second bit, and so we simply designate the two bit positions as S (for sign) and D (for digit). This labeling convention is not workable with larger two's complement numbers, but will serve the present purposes. The components of marking circuit 50b include an inverter 51b, an AND gate 52b, and an exclusive OR gate 53b. These are standard logic elements such as one would find on integrated circuit chips 74LS04, 74LS08, and 74LS86 respectively.

Circuit Element for Multiplying—FIG. 12

A circuit design for multiplying the signed binary numbers is shown in FIG. 12. Multiplier circuit 61a (called M') receives two input sets, and delivers a product as shown in the truth table. The output is a two-bit (two's complement) number which represents the value of the product, labeled as PS (product sign), and PD (product digit). To facilitate discussion, we abandon the convention of reversing sign, and so the resulting autocorrelation function will be the inverse of what has been shown in previous examples. The circuit computations may be made equivalent to formulae and other computational procedures by inverting the product values in the multiplier truth table (FIG. 11), or by inverting the final calculated values and adding one (FIG. 13).

Multiplier circuit 61a contains exclusive OR gate 62a, AND gate 63a, and AND gate 64a, which are some of the components used in marking circuit 50b (FIG. 11). As before, these are standard logic elements as would be found on integrated circuit chips 74LS86 and 74LS08.

Parallel Circuit for Marking and Autocorrelation—FIG. 13

The marking and multiplying circuits may be combined into a direct logic network for calculating the autocorrelation function for a cross section of the array. FIG. 13 shows such a network where the cross section has four array values. As indicated in FIG. 13A, the values from cross section 100a are fed into marking set 500c, which is called the E' set in keeping with the naming convention shown in FIG. 10. Marking set 500c contains five marking circuit elements 501c–505c (E0'–E4'). The input leads to the marking circuit elements are named according to the position of the value in the array (A1 to A4). Note that a zero is added to each end of the cross section by grounding the input lead at each end of marking set 500c, and these inputs are called A0 and A5. The sign and digit outputs of the marking circuit elements bear the corresponding designations of D0/S0, D1/S1, . . . D4/S4. These output values flow into a multiplexed wiring net (a data bus) which distrubutes the values to multipliers.

FIG. 13A also shows the M1' set of multipliers, and the connections into a summation circuit, as described below. Multiplier set 605 corresponds to the M1 set shown in FIG. 10, and so is designated as the M1' set. The elements of the set are multiplier circuit elements 605a–d. The output values are designated with numbers which indicate which input lines were multiplied. Thus line PD01 provides the value of the product digit for input from E0' and E1', and PS01 provides the value of the product sign for those same inputs. The output values of the multipliers flow into a set of adders, arranged in a cascade to provide summation of the values.

Summation circuit 705 is the functional equivalent of the S1 logic element in FIG. 10, and is referred to as S1'. In order to sum the values from the M1' multipliers, a cascade of three integrated circuits is needed, adders 705a, 705b, and 705c. These adders are standard integrated circuits, such as the 74LS283. The values from multiplier circuit elements 605a and 605b are first summed by adder 705a, then the output of that adder becomes an input to adder 705b, along with the value being delivered by multiplier circuit element 605c. The cascade of addition continues, with the output of adder 705c providing the values of S1' as a four-bit code using the two's complement convention.

FIG. 13B shows the remainder of the autocorrelation circuit, providing the M2', M3', M4', S2', and S3' values (it should be remembered that the values delivered by the M4' multiplier require no summation, and therefore provide S4 directly). Multiplier set 606 contains three multiplier circuit elements 606a–c, which receive input values from the data bus and deliver the product as described above. The output of these multipliers is delivered to summation circuit 706 (S2'), which contains adders 706a and 706b wired in a cascade as described above. The output of adder 706b provides the values of S2' as a four-bit, two's complement code.

Multiplier set 607 contains multiplier circuit elements 607a and 607b, which provides the M3' values. A single adder 707 is needed to sum the output of the multipliers, and it generates the S3' values as a four-bit, two's complement code.

The output of multiplier circuit element 608 directly provides the two's complement values of S4', with no additional circuitry being required.

Note also that the specifications of the circuit are for the "instantaneous" calculation of the autocorrelation function. There are no clocking functions, and calculation speed is determined principally by "settling" or "transition time" of the circuits. For this simple demonstration circuit, we estimate that the array can be marked and the autocorrelation function calculated in about 70 nanoseconds.

In order to simplify illustration of the circuit, we have shown marking and autocorrelation where there are only four values in the array. Any practical application of the invention will require a much larger image array, but the expansion of the circuit is straightforward and requires no further elaboration. A parallel logic network, such as the one we have shown, will require redundant wiring of array values along each axis direction. Preferably, the extensive wiring needed for sampling over several axes, as well as for the data-bus multiplexing, is accomplished by providing a dedicated integrated circuit chip.

We have not illustrated the process of summing the values of many cross sections to generate a summary function. This is a straightforward process, involving the cascade of simple adders similar to what is shown in FIG. 13. Anyone skilled in the art will be able to wire this system without special instruction.

Serial Circuit for Marking and Autocorrelation—FIG. 14

An alternative circuit design allows for the processing of the values in each cross section of the array, where the values are delivered as a temporal sequence. Each sample of the array is passed through a set of shift registers and logic gates, which operate to mark transitions in the sequence and to calculate the autocorrelation function as the sequence moves through the system. FIG. 14 shows the essential circuit components. For simplicity, we again illustrate circuit design where the sample from the array has only four values.

Figure 14A:
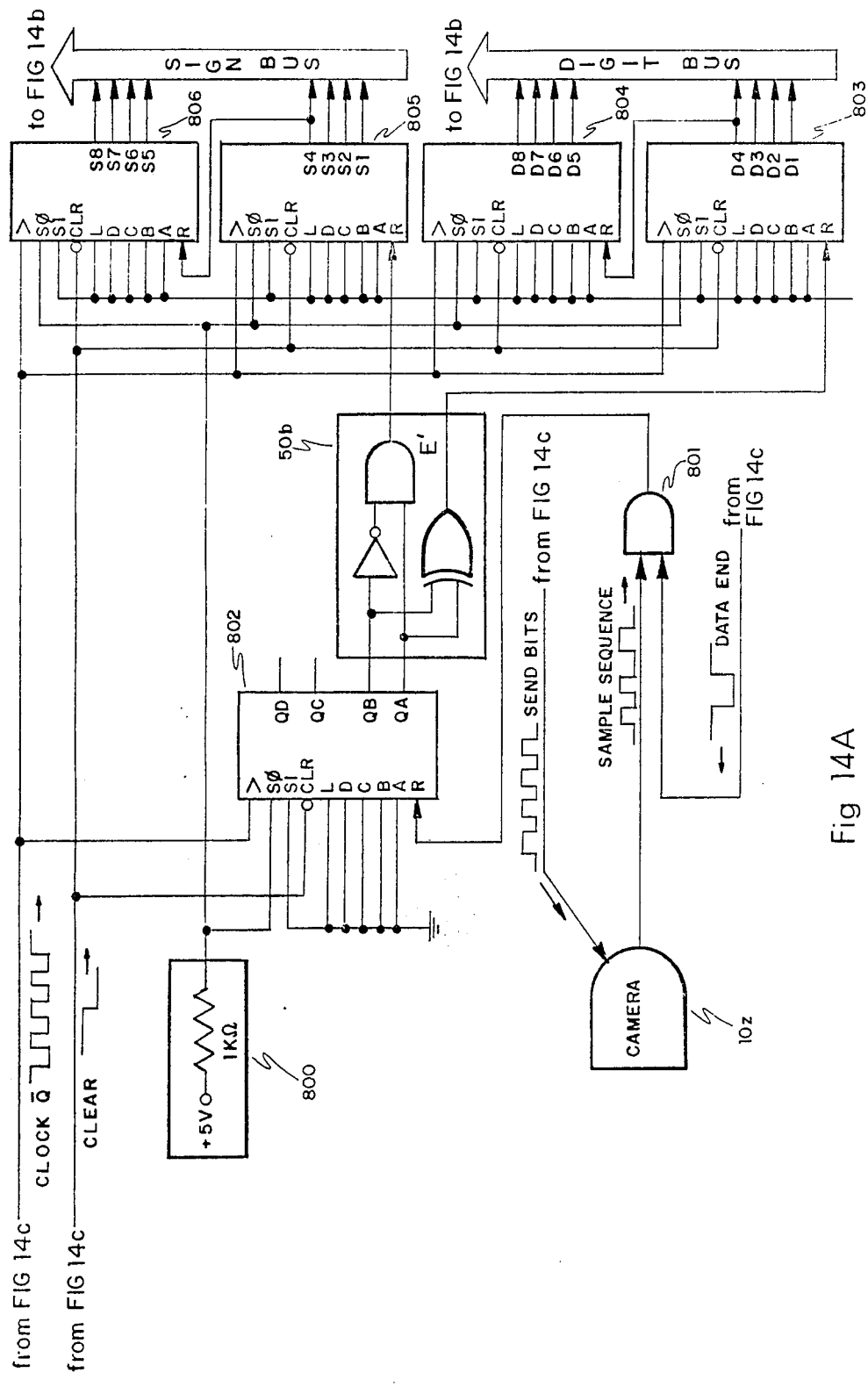

FIG. 14A illustrates the components needed for marking the transitions in the temporal sequence. A five-volt power supply 800 is shown, since its connections in the present circuit are nontrivial. An initial "clear" command is given to all logic components, which also provides the leading zero as required for setting transition markers. The sample sequence (the temporal code of values in the cross section) are delivered to one leg of AND gate 801. The other leg of 801 receives a nominal one at all times until the last sample value is received, after which it goes to zero, and thus the output of AND gate 801 will provide a zero at the end of the sample of array values.

With each cycle of the clock (discussed below), a sample value is passed into sample register 802, which is a simple shift register (commercially useful components are listed below). By the third clock cycle the first value is positioned at $Q_A$, and the "added" zero is positioned at $Q_B$. This provides the appropriate inputs for marking any transition which may exist at this location, which is accomplished by marking circuit 50b. The next clock cycle moves the first sample value to $Q_B$, and the second sample value moves into $Q_A$. Any transition which may exist at this position in the sample sequence is thus marked, and so forth for successive sample values.

Note that only one marking circuit is needed, since all transition marking will be accomplished by an iterative process—passing all successive values of the sample past the input leads of marking circuit 50b.

As sample values are successively passed through sample register 802, the appropriate transition markers are generated by marking circuit 50b, and the values for the markers are passed into digit registers 803–804, and sign registers 805–806. (Collectively, we may refer to these sign and digit registers as "marker registers.") As before, with four values in the array sample, there will be five transition markers. Each shift register can store four values, and thus must be "stacked" in order to store a longer sequence. As an aid to the illustration, we have labeled the output gates to show the relative position of elements in each stack.

Figure 14B:
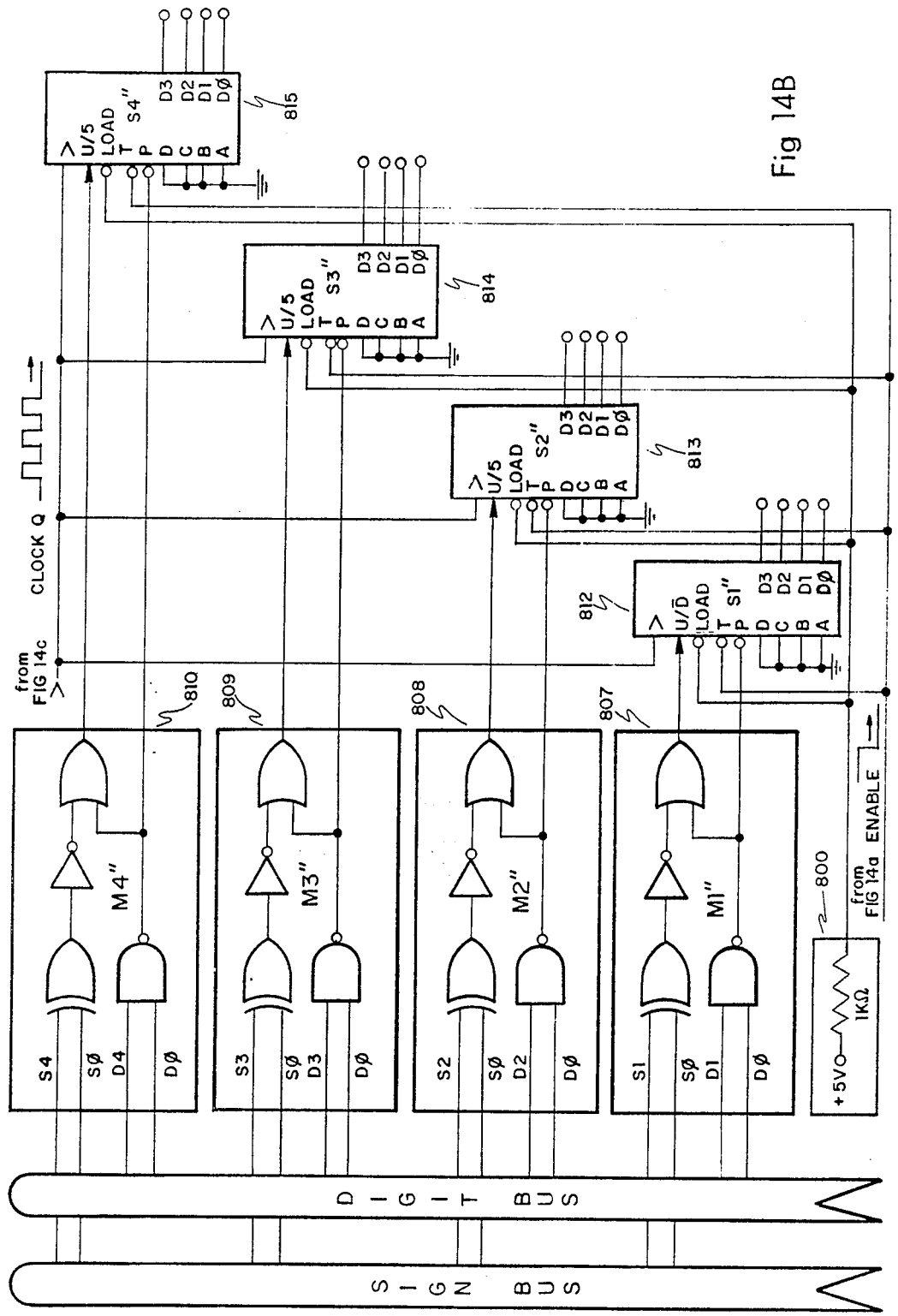

FIG. 14B shows how the output of the marker registers connect through a multiplexed "data bus" into the multiplier circuits. As with the parallel circuit, the sign and digit values of the marker are assorted to the appropriate input leads in the multipliers. Multiplier circuits 807–810 (M1''–M4') provide the calculation of the product values. These multipliers control the activity in four summation counters 812–815 (S1''–S4''). These counters "increment" (add one) when a positive product is delivered from the multiplier, and "decrement" (subtract one) when a negative product is delivered. As before, the output of the summation counters is coded as a four-bit, two's complement number.

Only four multipliers are needed, since the separation between markers is detected as an iterative process. As successive values in the sample sequence pass into the circuit, all one-space separations among markers are detected by multiplier circuit 807 (M1''). As each one-space separation is detected, it sends a command to increment or decrement counter 812 (S1''). Thus, at the end of the sample sequence, all one-space separations have been detected and the output value of counter 812 reflects the sum total of these events. Similarly, all markers having two spaces of separation are detected by multiplier 808, which commands summation counter 813 (S2'') to increment or decrement depending on the sign of the product. The relationship of remaining multipliers and summation counters follows this same pattern.

Note that the design of multipliers 807–810 is different from that shown in FIG. 12. The values needed for control of "up/down counters" (as used for summation in the present circuit) are not the same as those required for direct logic adders (as used in the parallel circuit). In the present case, the output must be the complement of what was used in the parallel circuit. Thus the truth table shown in FIG. 12 applies to the multiplier design used here, except that the inverse of the PS and PD values is generated by the circuit.

Figure 14C:
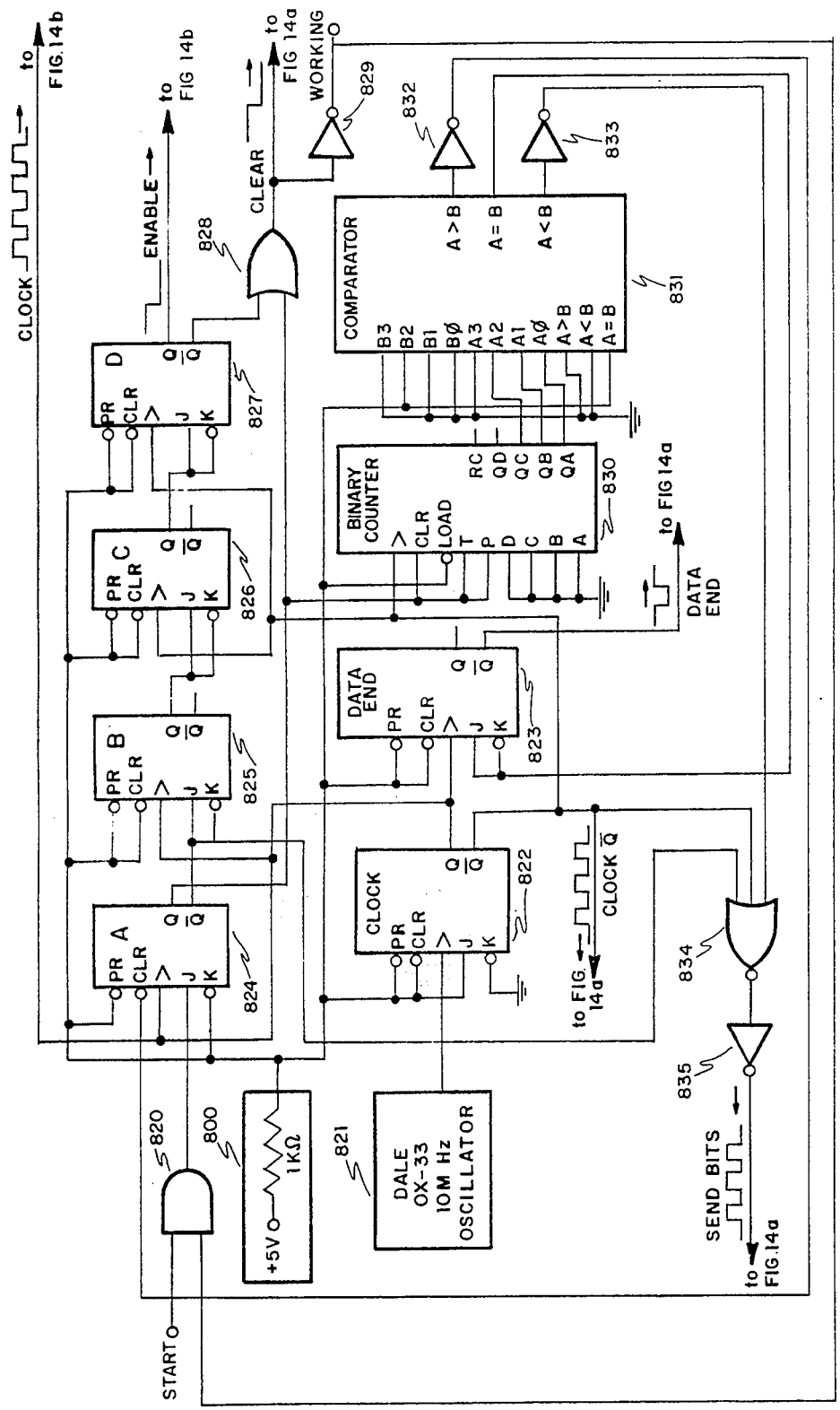

FIG. 14C shows the design of the timing and control circuit. The construction and operation of this circuit is straightforward and will be readily implemented by those skilled in the art, but discussion of a few basic points may be useful. Oscillator 821 provides the driving signal into clock 822. The output leads of clock 822 give complementary square wave pulses at 5 megahertz, so that each "clock cycle" is 200 nanoseconds. These clock signals control timers 824–827, and coordinated signals from clock and timers provide control of counter 830 and comparator 831. The function of timers, counter, and comparator is to provide appropriate timing of signals being delivered to the shift registers and summation counters described above. Processing time for the four value sample is about 1.4 microseconds, and longer samples add 0.2 microsecond for each additional value.

Figure 14D:
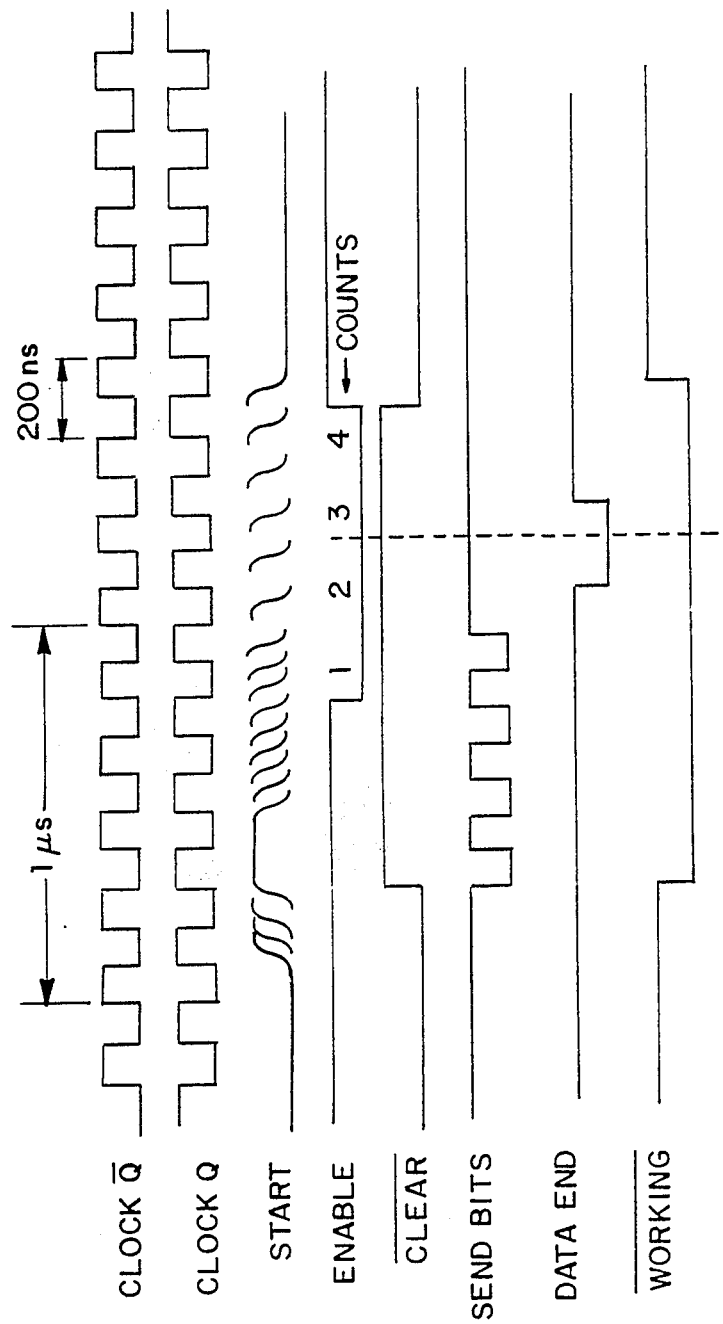

Major control signals are shown in FIG. 14D, and include:

Start—This signal begins the processing of a given sample sequence. Usually this would be provided by a more general control system which coordinates the present circuit with other system components. As suggested in FIG. 14D, the timing and shape of the start pulse is not critical.

Send bits—Each output from this control point commands the delivery of successive values in the sample sequence. A value is sent on each clock pulse.

Enable—This signal allows the counters to increment or decrement on the basis of the values being delivered from the multipliers. This is not essential to the operation of the system, but provides additional buffering.

Clear—This signal clears shift registers to allow for processing of the next sample sequence. If the individual values of the autocorrelation functions are required, the counter outputs must be stored, and the counters are cleared as well. If only the global summary function is needed, the counters are not cleared, and their total after processing all sample sequences provides the values of the global summary function.

Data end—Adds a zero to the end of the sample sequence.

Working—This signal simply indicates that the calculation of the autocorrelation function is in progress. Used for control and coordination with other system components.

Standard commercial components may be used for all operations, as follows:

AND gates—74LS08
OR gates—74LS32
Exclusive OR gates—74LS86
NAND gates—74S00
3 input NOR—74LS27
Inverter—74LS04
Shift register—74S194A
Up/Down counter—74LS169
Binary counter—74LS164A
Comparator—74LS85
JK Flip-Flop—74LS109
10 MHz Oscillator—X0-33

SUMMARY, RAMIFICATIONS AND SCOPE

Thus it is seen that we have provided a system for providing a fundamental and flexible definition of what constitutes shape and pattern information in an image, and for extracting and encoding that information using an autocorrelation function. We have further provided a system and methods for combining the information from different cross sections to produce a single global summary of the image. Evaluation of the global summary functions can be used for purposes of classification and comparison among shapes and patterns.

The advantages of the method include:

The use of a discrete value array, which provides operational simplicity for the question of what distances to evaluate, and what angles to scan.

The method is flexible with respect to the image characteristic which may be encoded, leaving open the opportunity to evalate brightness, color, texture, and other such characteristics.

The method is flexible with respect to the kind of values which may be used, thus allowing the selection of a kind of value which may be most suitable for representing a particular characteristic. This also allows the use of integers where computational simplicity is desirable, and binary numbers where simplicity and reliability of circuit design is a major consideration.

The use of signed binary numbers as transition markers has particular benefit, providing self-cancellation of certain cross-products in forming the autocorrelation function. This allows this function to be additive on disjoint sets.

It is not necessary to specify in advance what are the form charactistics which distinguish the shape or pattern being analyzed. The procedure does not require that "features" be specified and identified, and so the method may be applied to images having diverse form characteristics.

The method places minimal demands upon memory. The image is summarized using a global summary function, which reduces $k^2$ image values into a set of k summary values. This can further be condensed by calculation of the moments of the function, as described below.

The method is not sensitive to displacement of the image, so that image-components can be summarized irrespective of position or movement. Thus it can be used in applications where the camera and object being viewed are in relative motion. Since there is no requirement to store the location of the image-component, this also reduces the demands upon memory.

With appropriate selection of grid design, the method may be used in applications where rotational invariance is needed.

With approprite circuitry, the analysis may be done in "real time." As shown above, a direct logic network can provide a summary of the camera image in one microsecond or less.

The method is flexible with respect the required components. A solid-state camera, video cameras, or even a moving sensor may be used to generate the array. The sampling, encoding, and other computational steps may be accomplished with dedicated circuits, or can be done mainly by means of a computer using instructional programs.

As described below, the method allows for flexible sampling of the image. Thus specific image components may be selectively analyzed, and comparisons may be made among zones of the same image. Additionally, permanent location markers may be added, which make possible the analysis of the specific position of image components when that is desirable.

The analysis of the image, and comparison among images is completely quantitative. In comparing forms, the degree of similarity can be indicated by the calculation of a single value (e.g., the mean square difference), and the relative similarity among a set is indicated by the relative size of these single values for each pair-wise comparison.

While we have described a preferred embodiment of the basic encoding circuit, it will be apparent to those skilled in the art that many variations and ramifications are possible. Some of these possibilities will now be discussed.

Camera Circuit 10a—FIG. 15

FIG. 15 shows a camera system 10a in which the basic camera is separate from the value array. A video camera 11 or a similar raster scan device is used, and the electronic values are converted to integers using a digitizing circuit 12. The values are then distributed into a storage array 13. The storage array provides the values required by sampling circuit 40, and for other encoding steps. Methods for storing video signals into an array are well known for the Cartesian design, and can be readily adapted to the hexagonal array design.

Though the sensor surface in commercially available solid-state cameras have an intrinsic array design, it is still best to load the values into a separate storage array 13. This is because such cameras deliver the values from one axis only. Thus, array 13 receives the values being delivered sequentially from the camera, and stores them as an array which allows redundant sampling of cross sections across several axes. Array 13 also makes it possible to use an array design which does not correspond to the design of the sensing surface of the camera. This is accomplished by blanking areas, skipping every other cell, or otherwise restructuring the data as may be required in replotting the values.

Restricted Sampling of the Image—FIG. 16

Here the image is selectively sampled, producing a global summary function which reflects only certain zones in the image. FIG. 16A illustrates a sampling circuit 40a, which is able to extract values from short cross sections at certain locations in the array. The sum of the autocorrelation functions of these zone-specific cross sections therefore will produce a global summary function for a sub-component of the image. This has the effect of producing a global summary function as though the shape or pattern in that zone was the only information contained in the image.

FIG. 16B illustrates what is accomplished functionally by the circuit. Image 20d and image 20d' are shown, with the outer boundary of the value array indicated by dotted lines. When image 20d sampled by circuit 40a, the system will produce the same global summary function as would be produced by the sampling of 20d'. Thus image 20d' can be called a "virtual image" of image 20d, in the sense that the global summary functions of each image are equivalent.

The cross sections to be sampled may be specified by prewired connections, where the location of shapes to be compared is always the same. However, sampling circuit 40a will be most useful if there is some flexibility about the zone which is sampled. To accomplish this, the sampling circuit and array can be designed to allow instructional specification of the array elements to be included in the selection of a cross section. Thus, where the array values can be addressed individually, one can specify by instruction which sets of elements will comprise the cross sections for sampling a certain zone.

The functions described above can be accomplished most readily if circuit 40a has the capacity to store instructions, sample values, and/or the derived results.

Use of the Marking Circuit for Masking—FIG. 17

As an alternative to selective sampling, the marking circuit can be designed to erase ("mask") particular sectors in the image. FIG. 17 illustrates the operation of marking circuit 50c, which will selectively generate values according to a predetermined specification (such as a program), so that the values in certain sectors of the image are set to zero.

FIG. 17A shows an hexagonal array, with cross section 104 being sampled by sampling circuit 40 to produce sample 104'. The values in 104' are shown as Xs, indicating that they may vary in value at each position in the sample depending on the image which is being registered upon the array. When this sample is passed into marking circuit 50c, particular values of the array are set to zero.

FIG. 17B shows a second cross section 105 being sampled from the array, and marking circuit again sets certain values to zero. It should be clear that the values which are to be set to zero must be predetermined according to the cross section that is sampled. By this method the information which is contained in a particular sector of the image can be selectively erased from the marker sequences, and thus has no influence on the values calculated for the autocorrelation and summary functions.

Adding Location Markers—FIG. 18

One of the benefits of the present invention is its relative insensitivity to motion of the pattern within the array. In other words, the global summary function has a substantial amount of "motion invariance," staying the same, for example, when a shape is moved from one zone in the array to another.

For applications where exact position of the shape is important, FIG. 18 shows one method of dealing with such a problem. Marking circuit 50d is designed to place a location marker within the sample of cross sections—i.e. to add ones at predetermined locations in the sample to provide reference points in the processing of the other sampled values. One easy method is to place a one at each end of every cross section, essentially drawing a permanent frame at the edge of the array. The resulting global summary function will now contain features which systematically reflect the boundary, and the distance of all other shape elements in relation to that boundary.

Thus FIG. 18A shows image 20e, where the shape of a fish is centered on the array, as shown by the dotted line. Virtual image 20e' places the boundary marker at the edge of the array, and the resulting global summary function will reflect the additional distance relationships. FIG. 18B shows image 20e again, now near the edge of the array. Now the virtual image 20e' will produce a global summary function which can be distinguished from the function for image 20a'.

Computational Circuits 60a–80a—FIG. 19

FIG. 19 illustrates a system in which storage capacity has been added to circuits 60-80. The operations of camera 10, sampling circuit 40, and marking circuit 50 are shown as a system 10/50. The output from system 10/50 is sent to autocorrelation circuit 60a, which is able to store the autocorrelation functions derived from each cross section, or hold other algebraic equivalents of that information (as described below).

Summary circuit 70a has long-term storage as may be needed as a library of global summary functions for various images, or their algebraic equivalents.

Alternatively, comparison circuit 80a has storage capacity as may be needed for the library of summary functions, and/or for storing the results of comparison among the images.

Implementing the Invention with a General Computer—FIG. 20

A more general computer can be used for calculating values and or storing values at any point in the system. For example, FIG. 20A shows a system which consists of video camera 10x and a programmed computer 90. Camera 10x incorporates threshold and shaping circuits to convert the analog signal into binary values. Additionally, the timing of the raster scan is controlled by the clocking cycle of the computer. Using this system, the image may be read directly out from the camera and into an array of memory locations in the computer, and all subsequent calculations for implementing the invention can be accomplished by the computer.

An example of how the program would be structured to compute the autocorrelation and global summary functions is given below. In this example the subroutine for input of array values is written for manual input at the keyboard of the computer. Additionally, the example is written for two-axis sampling of a Cartesian array, with 16 rows and 17 columns (an arbitrary number, chosen partly to demonstrate that the array need not be symmetrical). The material below also includes the computer output, showing the individual autocorrelation functions, and the global summary function.

```
10 W=16:H=17:I=W-IF H>W THEN I=H
40 DIM AR%(I+2),RXY%(W+H,W+2),DI%(W,H)
50 GOSUB 620
60 REM
                MAIN LOOP
70 FOR ROW=1 TO H:GOSUB 760:GOSUB 310:PRINT:NEXT:ROW
120 FOR COLUMN = 1 TO W:GOSUB 700:GOSUB 310:PRINT:NEXT COLUMN
170 PRINT:PRINT:PRINT:PRINT:PRINT"GLOBAL SUMMARY FUNCTION";
175 I=W: IF H>W THEN I=H
220 FOR X=1 TO I:FOR Y=1 TO W+H:TT=TT+RXY%(Y,X):NEXT Y:PRINT
    TT;" ";:TT=0:NEXT X:END
300 REM
                AUTOCORRELATE ONE LINE
310 K=LEN(IN$):IN$="0"+IN$+"0"
330 REM CHANGE BINARY PIXELS TO 0,-1, OR 1
340 FOR I=0 TO K+1:A=VAL(MID$(IN$,I+1,1)):B=VAL(MID$(IN$,I+2,1)):
    AR%(I)=B-A:NEXT I
390 NU=NU+1
400 FOR N=1 TO K:FOR I=0 TO K-N
420 A=AR%(I):B=AR%(I+N):RXY%(NU,N)=RXY%(NU,N)-A*B
430 NEXT I: NEXT N
520 NP=NU:IF NU<=H THEN PRINT "ROW -";
530 IF NU>H THEN PRINT "COLUMN - ";:NP-H
540 NP$=STR$(NP)
550 IF LEN(NP$)<3 THEN NP$=" "+NP$:GOTO 550
560 PRINT NP$;"....";
570 FOR N=1 TO K
580 IF RXY%(NU,N)>-1 THEN PRINT " ";
590 PRINT RXY%(NU,N);" ";
600 NEXT N
610 RETURN
620 REM
                INITIALIZE IMAGE
630 FOR COLUMN=1 TO H
640 READ A$
650 FOR ROW =1 TO W:DI%(ROW,COLUMN)=VAL(MID$(A$,ROW,1)):NEXT
    ROW
680 NEXT COLUMN:RETURN
700 REM
                GET A COLUMN OF PIXELS INTO IN$
710 IN$="":FOR I=1 TO H:IN$=IN$+STR$(DI%(COLUMN,I))
720 NEXT I: RETURN
760 REM
                GET A ROW OF PIXELS INTO IN$
770 IN$="":FOR I=1 TO W:IN$=IN$+STR$(DI%(I,ROW)):NEXT I:RETURN
820 REM
                PICTURE DATA
830 DATA 0000000001111000
840 DATA 0000001111111110
850 DATA 0000111111111110
860 DATA 0001111110000111
870 DATA 0011111100000011
880 DATA 0111111000000001
890 DATA 0111111000000001
900 DATA 1111111000000000
910 DATA 1111111000000000
920 DATA 1111111111000000
930 DATA 1111111111111000
940 DATA 1111111111111100
950 DATA 1111111111111100
960 DATA 1111111111111100
970 DATA 0111111111111100
980 DATA 0011111111111000
990 DATA 0000001111100000
1000 RETURN
```

| SAMPLE RUN |||||||||||||||||||
|---|---|---|---|---|---|---|---|---|---|---|---|---|---|---|---|---|---|---|
| AUTOCORRELATION FUNCTIONS |||||||||||||||||||
| ROW | 1— | 0 | 0 | 0 | 1 | 0 | 0 | 0 | 0 | 0 | 0 | 0 | 0 | 0 | 0 | 0 | 0 |
| ROW | 2— | 0 | 0 | 0 | 0 | 0 | 0 | 0 | 1 | 0 | 0 | 0 | 0 | 0 | 0 | 0 |
| ROW | 3— | 0 | 0 | 0 | 0 | 0 | 0 | 0 | 0 | 0 | 1 | 0 | 0 | 0 | 0 | 0 |
| ROW | 4— | 0 | 0 | 1 | 1 | 0 | 1 | −1 | 0 | 0 | −1 | 0 | 1 | 0 | 1 | 0 | 0 |
| ROW | 5— | 0 | ! | 0 | 0 | 0 | 0 | 0 | −1 | 0 | 0 | 0 | −1 | 0 | 1 | 0 | 0 |
| ROW | 6— | 1 | 0 | 0 | 0 | 0 | ! | 0 | ! | −1 | 0 | 0 | 0 | 0 | −1 | 1 | 0 |

-continued

SAMPLE RUN

| | | | | | | | | | | | | | | | | | | |
|---|---|---|---|---|---|---|---|---|---|---|---|---|---|---|---|---|---|---|
| ROW | 7— | 1 | 0 | 0 | 0 | 0 | 1 | 0 | 1 | −1 | 0 | 0 | 0 | 0 | −1 | 1 | 0 | |
| ROW | 8— | 0 | 0 | 0 | 0 | 0 | 0 | 1 | 0 | 0 | 0 | 0 | 0 | 0 | 0 | 0 | 0 | |
| ROW | 9— | 0 | 0 | 0 | 0 | 0 | 0 | 1 | 0 | 0 | 0 | 0 | 0 | 0 | 0 | 0 | 0 | |
| ROW | 10— | 0 | 0 | 0 | 0 | 0 | 0 | 0 | 0 | 0 | 1 | 0 | 0 | 0 | 0 | 0 | 0 |
| ROW | 11— | 0 | 0 | 0 | 0 | 0 | 0 | 0 | 0 | 0 | 0 | 0 | 0 | 1 | 0 | 0 | 0 |
| ROW | 12— | 0 | 0 | 0 | 0 | 0 | 0 | 0 | 0 | 0 | 0 | 0 | 0 | 1 | 0 | 0 | |
| ROW | 13— | 0 | 0 | 0 | 0 | 0 | 0 | 0 | 0 | 0 | 0 | 0 | 0 | 1 | 0 | 0 | |
| ROW | 14— | 0 | 0 | 0 | 0 | 0 | 0 | 0 | 0 | 0 | 0 | 0 | 0 | 1 | 0 | 0 | |
| ROW | 15— | 0 | 0 | 0 | 0 | 0 | 0 | 0 | 0 | 0 | 0 | 0 | 1 | 0 | 0 | 0 | |
| ROW | 16— | 0 | 0 | 0 | 0 | 0 | 0 | 0 | 0 | 0 | 1 | 0 | 0 | 0 | 0 | 0 | |
| ROW | 17— | 0 | 0 | 0 | 0 | 1 | 0 | 0 | 0 | 0 | 0 | 0 | 0 | 0 | 0 | 0 | |
| COLUMN | 1— | 0 | 0 | 0 | 0 | 0 | 0 | 1 | 0 | 0 | 0 | 0 | 0 | 0 | 0 | 0 | 0 |
| COLUMN | 2— | 0 | 0 | 0 | 0 | 0 | 0 | 0 | 0 | 0 | 1 | 0 | 0 | 0 | 0 | 0 | 0 |
| COLUMN | 3— | 0 | 0 | 0 | 0 | 0 | 0 | 0 | 0 | 0 | 0 | 1 | 0 | 0 | 0 | 0 | 0 |
| COLUMN | 4— | 0 | 0 | 0 | 0 | 0 | 0 | 0 | 0 | 0 | 0 | 0 | 1 | 0 | 0 | 0 | 0 |
| COLUMN | 5— | 0 | 0 | 0 | 0 | 0 | 0 | 0 | 0 | 0 | 0 | 0 | 0 | 1 | 0 | 0 | 0 |
| COLUMN | 6— | 0 | 0 | 0 | 0 | 0 | 0 | 0 | 0 | 0 | 0 | 0 | 0 | 1 | 0 | 0 | 0 |
| COLUMN | 7— | 0 | 0 | 0 | 0 | 0 | 0 | 0 | 0 | 0 | 0 | 0 | 0 | 0 | 0 | 1 | 0 |
| COLUMN | 8— | 0 | 0 | 0 | 2 | 0 | 0 | 0 | 0 | 0 | 0 | −1 | 0 | 0 | 0 | 1 | 0 |
| COLUMN | 9— | 0 | 0 | 1 | 0 | 1 | 0 | 0 | 0 | 0 | 0 | 0 | −1 | 0 | 0 | 1 | 0 |
| COLUMN | 10— | 0 | 0 | 1 | 0 | 0 | 1 | 0 | 1 | −1 | 0 | 0 | 0 | −1 | 0 | 0 | 1 |
| COLUMN | 11— | 0 | 0 | 1 | 0 | 0 | 0 | 2 | 0 | 0 | −1 | 0 | 0 | −1 | 0 | 0 | 1 |
| COLUMN | 12— | 0 | 0 | 1 | 0 | 0 | 1 | 1 | 0 | 0 | −1 | 0 | −1 | 0 | 0 | 1 | 0 |
| COLUMN | 13— | 0 | 0 | 1 | 0 | 0 | 1 | 1 | 0 | 0 | −1 | 0 | −1 | 0 | 0 | 1 | 0 |
| COLUMN | 14— | 0 | 0 | 1 | 1 | 0 | 0 | 1 | 0 | 0 | −1 | −1 | 0 | 0 | 1 | 0 | 0 |
| COLUMN | 15— | 0 | 0 | 0 | 1 | 0 | 0 | 0 | 0 | 0 | 0 | 0 | 0 | 0 | 0 | 0 | 0 |
| COLUMN | 16— | 0 | 0 | 0 | 1 | 0 | 0 | 0 | 0 | 0 | 0 | 0 | 0 | 0 | 0 | 0 | 0 |
| GLOBAL SUMMARY FUNCTION | | | | | | | | | | | | | | | | | | |
| | | 2 | 1 | 7 | 7 | 2 | 8 | 7 | 2 | −2 | −3 | 1 | −1 | 1 | 3 | 2 | 5 | 2 |

FIG. 20B illustrates a system, containing system components 60y-60y, with unspecified computational and storage deficiencies. Any or all of the components may be supplemented by the addition of a general computer 90 which uses instructional programs (i.e. "software") to accomplish what is required of the component. This may include conditions in which the entire operation of the component is accomplished by means of computer 90. The implementation of this hybred arrangement can be easily accomplished by those skilled in the art, given the information we have provided above and below.

Equivalent Systems and Calculations—FIG. 21

The autocorrelation and global summary functions which are central to our invention may be calculated in a variety of ways, or replaced by other algebraically equivalent functions. It is impossible to list all the equivalent mathematical possibilities which we take to be examples of our invention. We describe at least the "moments" of the autocorrelation function, a linear combination of exponentially weighted products of the independent and dependent variables, as explained below. These "autocorrelation moments" may be combined into "summary moments," which in turn may be used for comparison and classification of images.

The moments of the autocorrelation function are defined as follows: let S(n) be the autocorrelation function of a given cross section. For each integer q we define the $q^{th}$ moment $i_q$ of the cross section as the number $$i_q = S(1) + 2^q S(2) + 3^q S(3) + 4^q S(4) \ldots$$

FIG. 21A gives an example of how the moments of the autocorrelation function are calculated. Autocorrelation function 900 has four values of n; S(1) and S(3) are both 0, while S(2) = 1, and S(4) = 2. A set of autocorrelation moments (900') is derived by summing the cross-product of the values of S at each value of n, as a cross-product of n taken to the power of the moment being calculated. An indeterminate number of powers may be calculated; for illustration we show the moments being calculated up to the second power. Computation set 901' shows the calculation of the 0th moment $i^0$. Since the 0th power of each n value equals 0, $i_0$ equals the sum of the observed values of S(n) at each position in the histogram as shown in computation set 901'. Computation set 902' shows how the 1st moment $i_1$ is derived. Here the values of n (1, 2, 3, and 4) are taken to the first power, then multiplied by S(n) to generate the values to be summed. Computation set 903' generates the 2nd moment $i_2$. The interval values of the histogram (1, 2, 3, and 4) are now squared before being multiplied by the histogram values of S(n). The cross-product of the histogram values and value of n are then summed to produce $i_2$.

Thus, in the present example, moment set 900' contains the values: $i_0 = 3$, $i_1 = 10$, and $i_2 = 20$. It should be clear from the formula and by the example of FIG. 21A how to calculate the higher moments for the histogram should they be needed. Though it may not be intuitively obvious, from a mathematical standpoint the set of moments 900' reflects basic properties of autocorrelation function 900.

These autocorrelation moments may also be combined algebraically to produce "summary moments" ($I_q$) for the entire sample of cross sections. For example, FIG. 14B shows autocorrelation moment set 900', and two additional (hypothetical) moment sets 910' and 920'. The moment sets are combined by simple summation of each power level to produce summary moment set 999'. The combination of the moments from all cross sections provides a global summary of shape properties in the image, and thus can be used for classification and comparison among shapes and patterns. It should be clear that other methods of combination (such as an average) may be used to produce the summary moments.

Direct Autocorrelation of Array Values—FIG. 22

For some applications, it may prove useful to encode the array values without marking the transitions. As an example, FIG. 22 shows the summary of images which consist of the outline drawings, where the marking circuit has been eliminated from the circuit and the array values have been autocorrelated directly. Images 20g–i are the outline drawings of a butterfly and two mushrooms. The images have each been processed by sampling circuit 30, autocorrelation circuit 50, and summary circuit 70, shown in the illustration as system 30//70. Processing of the images by this system has yielded a "raw summary function" for each of the images, shown as summary functions 340, 350, and 360. These summary functions are compared by comparison circuit 80 to provide an operational judgment of the similarity of the images. Using a mean square difference, the outline drawings of the two mushrooms are judged to be most similar, which corresponds to our own judgment of these shapes.

A Broader Definition of Transition Marking

We have illustrated the process of marking transitions in binary images using signed binary numbers, designated as $E_i$. There are other ways of deriving a marker sequence from the sampled cross section. In general the sequence derived from $A_1, A_2, \ldots A_k$ can be any function of the adjacent values:

$$F_i = f(A_{i-u}, A_{i-u-1} \ldots A_{i-1}, A_i, A_{i+1}, A_{i+2}, \ldots A_{i+v})$$

where the derived value $F_i$ depends on u values prior to $A_i$ and v values after $A_i$ in the sequence. We will refer to all such possibilities as "being derived from the original sample," which may include simply repeating the sample values or generating special transition marking sequence of values such as $E_i$ or $F_i$. Additionally, depending on application and circuit design, the marking can be done using binary numbers, signed binary numbers, integers, or even noninteger values.

Rotation and Movement

We have described an invention which embodies a measurement procedure which applies quite generally to an array of values organized into a collection of cross sections. We have indicated above that this measurement is characteristic to the array. Additionally, the global summary function is insensitive to the lateral displacement of the pattern in the analysis field, and so the simple comparison of the global summary functions (using for example the mean-square difference) is effective for recognition even if the shape or pattern is moving.

There are many advantages to a system which allows for relative motion between the camera and the object. The camera could be mounted on a moving vehicle, or hand held, or the object could be moving. In all these cases this invention would work as well as if there were no motion. In fact, it can be shown that deliberate moving of the camera to provide independent samples of the cross sections can improve the quality of the global summary because it uses more information. This can be of use where especially high resolution is essential to the recognition, or simply when the camera and object are in relative motion.

If the recognition must be accomplished under conditions of rotation (e.g., a rotating object is to be recognized), it is necessary to provide for more extensive sampling of cross sections. The image-function for the array will be least sensitive to rotation if the cross sections are taken at many angles. For the standard rectalinear array provided by most cameras, one can store values and compute cross sectional functions across the diagonals. It should be noted, however, that the distance between members of the array will be different for the diagonals than for the rows and columns. For some applications this may require correction, or the selection at the outset of an hexagonal array where spacing is equal in three directions.

It should be noted that one could also rotate the camera, adding the successive samples to the global summary function. This would have the effect of creating a summary which reflects the autocorrelations derived from many angles, and so the summary function would be able to recognize form and pattern irrespective of its rotation. For these reasons we also include in our invention any repeated use of the procedure of calculating a cross section autocorrelation function at different times.

Finally, if both speed and rotational invariance is essential, one can design the sensor array of the camera to provide a larger number of axes, or use an array which has radial symmetry of the elements. Each design option has its own special cost and benefit, and discussion of these particulars is beyond the scope of the present application.

Hierarchical Classification

If $I_q$ is the average of the different $i_q$ from different cross sections, then the summary moments $I_0, I_1, \ldots I_q$ may be used for the hierarchical classification of image arrays. Thus all arrays with the same $I_0$ could be classified together, within that classification, all arrays with the same $I_1$ could be classified together, within that classification all arrays with the same $I_2$ can be classified together, etc.

This hierarchical classification is of use in tables where a large number of image arrays are to be compared and recognized: rather than comparing an array to all others, it can be compared only to those with similar summary moments. A further use of these summary moments $I_q$ is in recognition tasks where an image form is to be recognized independent of its size, for example an aircraft might need to be identified at various distances from the camera. Ratios of different power of the average moments are suited to this task because they are approximately constant and unchanged by changing the size of the image form.

For recognition of distorted shapes, or where one seeks to group like forms on the basis of "family resemblance," more extensive hierarchical classification is needed to accomplish recognition. One must teach the machine to use the same name under a variety of stimulus conditions. These classification procedures are beyond the scope of the present application, but a few comments are in order. In such a comparison problem we may have an unnamed pattern of numbers in a fixed array of locations, to be compared with a large collection of stored arrays. The problem is to find the stored array most similar to the given one. Above we have described how to use the mean absolute and square difference of the global summary functions to quantify this problem. Still, if there is a large class of stored arrays it is impractical to search linearly through all of them, and a hierarchical search is desirable. As indicated above, the moments $I_q$, where $q=1, 2, \ldots$ provide a natural hierarchy for this purpose.

Preferred Camera Design

With respect to embodiment, there are numerous alternatives as to how circuitry might be designed to accomplish the computation of S(n) and the corresponding global summary function. The choice of method will depend heavily on application goals. The logic network (the first design described above) involves extensive wiring, but would be the method of choice if one is designing and building an integrated circuit to perform the calculations.

The most efficient and flexible design, however, should include the use of a binary camera which uses a hexagonal arrangement of the image-sensing elements, and which uses an etched direct-logic network, as described above. The hexagonal grid design provides cross-sections which better reflect component dimensions of the image, and the resulting summary functions are less sensitive to rotation of image components.

Algebraic Equivalents of the Correlation Functions

With respect to the calculation of S(n) values, and their average P(n) (or some more general combination), a variety of alternative but logically equivalent equations could be used. Likewise, a skilled computer programmer could readily write an algorithm to accomplish the calculation of these functions, but whose operations are logically equivalent to the equations given above. For example, the moments can be computed in a variety of alternative ways; the results are still algebraically equivalent to the procedures described here. With respect to the electronic devices, any skilled electrical engineer will be able to develop an alternative circuit design, but one which accomplished a coding of pattern in a way which is formally equivalent to the equations for S(n) and P(n) given above. Thus our invention is applicable to any procedure of embodiment which accomplishes the encoding specified by the equations.

Encoding of Non-Binary Images

Although all examples have been given using simple black and white images, the invention applies also to the encoding of images having other characteristics. With appropriate circuitry the multipliers and summators can deal with continuous brightless levels in an image, color, or even texture. The formal requirements are only that the image values be registered or tranformed into an array of numbers which has regular spacing, that cross sections of the array be marked, and that the derived values be autocorrelated. It is not necessary for the values to be binary, or even integer numbers. Nor is it necessary for the derived markers to be integer numbers. We have illustrated the invention using signed binary markers (i.e., having the value of $+1$, 0, or $-1$). This is a useful method, but other integer or noninteger values could be used.

The analysis may also involve the encoding of several properties at once, and the use of comparison at different levels among several summary functions derived from the same image. This would be especially appropriate for the comparison of color images, where we judge the different colors and brightness as being qualitatively distinct. In this application, one might expect that the "summary" of the image might require the use of several functions, each providing information about a particular characteristic of the image, such as color or brightness. The degree to which these could be further combined into a simpler form would depend upon application.

Accordingly, the scope of the invention should be determined by the appended claims and their legal equivalents, and not by the examples given.

We claim:

1. A system for encoding information from the optical image of a camera, comprising,
   (a) means for representing a predetermined characteristic of said image by an array of values,
   (b) means for sampling an ordered sequence of the values of said array, and for marking transitions in said ordered sequence by a sequence of marker values, and
   (c) means for autocorrelating said sequence of marker values to provide an autocorrelation function for said sequence of marker values, and thus for said ordered sequence.

2. The encoding system of claim 1, further including means for storing said values of said array, said sequence of marker values, and the values of said autocorrelation function.

3. The encoding system of claim 1 wherein said means for sampling, said means for marking transitions, and said means for autocorrelating said sequence of marker values comprises a hard-wired, direct-logic network.

4. The encoding system of claim 1 wherein said means for sampling said ordered sequence of values of said array is arranged to provide said ordered sequence as a temporal signal, and wherein said means for marking transitions and for autocorrelation of said sequence of marker values comprises a plurality of shift registers and gates which process said temporal signal.

5. The encoding system of claim 1 wherein said means for autocorrelating said sequence of marker values comprises a computer and an instructional program for said computer.

6. The encoding system of claim 1, further including means for preselecting a plurality of said ordered sequences and for calculating a corresponding plurality of autocorrelation functions, wherein said means for marking transitions is applied to each member of said plurality of ordered sequences and said means for autocorrelating is applied to each sequence of marker values thus derived, whereby an autocorrelation function is generated for each member of said plurality of ordered sequences.

7. The encoding system of claim 6 wherein said means for representing predetermined characteristics of said image is arranged to generate an array which has an hexagonal shape, and said means for preselecting said plurality of ordered sequences is arranged to preselect those sequences which are the natural cross sections of said hexagonal array in three directions.

8. The encoding system of claim 6 wherein said means for preselecting said plurality of ordered sequences is arranged to select said sequences from a sector of said array, whereby the information contained at specific locations in said image may be isolated and selectively encoded.

9. The encoding system of claim 6, further including means for adding a set of specific location markers to said sequence of marker values, whereby the information contained at specific locations in said image may determine the values of said autocorrelation functions.

10. The encoding system of claim 6, further including means for algebraically combining said plurality of autocorrelation functions, so as to provide a single summary function for said array and thus for said image.

11. The encoding system of claim 10, further including means for storing said summary function.

12. The encoding system of claim 10 wherein said means for algebraically combining said plurality of autocorrelation functions is arranged to calculate the sum of said plurality of autocorrelation functions.

13. The encoding system of claim 10, further including means for repeating said encoding and combining process, thereby to accommodate applications in which said image array moves in relation to said camera.

14. The encoding system of claim 10, further including means for sampling a plurality of said images, and for the repeated application of said means for preselecting a plurality of ordered sequences for each said image, of said means for calculating said corresponding plurality of autocorrelation functions for each said image, of said means of combining said plurality of autocorrelation functions into a single summary function for each said image, and for storing said summary functions.

15. The encoding system of claim 14, further including means for judging similarity among said images by the calculation of a comparison value for each pair of said summary functions, whereby the relative magnitude of each comparison value defines similarity among said images.

16. The encoding system of claim 15 wherein said means for judging is accomplished by the calculation of a comparison value which is the mean square difference between the summary functions.

17. The encoding system of claim 15 wherein said means for judging is accomplished by the calculation of a comparison value which is the absolute difference between the cumulative forms of said summary functions.

18. The encoding system of claim 6, further including means for calculating and storing a set of moments for said plurality of autocorrelation functions, means for averaging said set of moments to produce a set of summary moments, and means for classifying the information in said array using the relative magnitude of elements in said set of summary moments.

19. A system for encoding and combining information from the optical image of a camera, comprising,
 (a) means for representing predetermined characteristics of said image by an array of values,
 (b) means for preselecting a plurality of ordered sequences of values of said array,
 (c) means for sampling each member of said plurality of ordered sequences, and for autocorrelating each member of said plurality to produce a coresponding plurality of autocorrelation functions, and
 (d) means for algebraically combining said plurality of autocorrelation functions into a single summary function for said array and thus for said image.

20. The enooding system of claim 19, further including means for sampling a plurality of said images, means for preselecting said plurality of ordered sequences for each said image, means for calculating said plurality of autocorrelation functions for each said image, means for calculating said single summary function for each said image, means for storing said summary functions, and means for comparing and establishing the degree of quantative similarity among said summary functions by the calculation of a comparison value.

* * * * *

UNITED STATES PATENT AND TRADEMARK OFFICE
CERTIFICATE OF CORRECTION

PATENT NO. : 4,745,633
DATED : May 17, 1988
INVENTOR(S) : Peter Waksman and Ernest Greene It is certified that error appears in the above-identified patent and that said Letters Patent is hereby corrected as shown below:

Col 5, line 51, add reference number -- 821 -- at beginning of line

Col 9, line 30, change "$A_i+1$" to -- $A_{i+1}$ --.

Col 9, line 47, change "$E_1E_{n-1} + E_2E_{n-2}$" to -- $E_1E_{n+1} + E_2E_{n+2}$ --

Col 9, line 63, change "$S_{(n)} = S_{(n)}$" to -- $S(n) = S(n)$ --.

Col 9, after line 63, add program instruction -- Next i: Next n --.

Col 14, line 2-3, change "(E0-'-E4')" to -- (E0'-E4') --.

Col 21-22, line 10 of program list, change "I=W.IF H>W" to
        -- I=W:IF H>W --

Col 21-22, line 70 of program list, change "Next:Row" to
        -- Next Row --

Col 21-22, line 530 of program list, change "NP-H" to
        -- NP=NP-H --

Col 24, line 34, change "$I^0$" to -- $I_0$ --.

Col 25, line 30, change "$A_{i-u-1}$" to -- $A_{i-(u-1)}$ --.

Col 25, line 30, change "$A_{1-1}$" to -- $A_{i-1}$ --.

Col 26, line 32 change "$I_1$" to -- $I_1$ --.

Col 26, line 36 change "$I_1$" to -- $I_1$ --.

Page 1 of 2

UNITED STATES PATENT AND TRADEMARK OFFICE
CERTIFICATE OF CORRECTION

PATENT NO. : 4,745,633
DATED : May 17, 1988
INVENTOR(S) : Peter Waksman and Ernest Greene It is certified that error appears in the above-identified patent and that said Letters Patent is hereby corrected as shown below:

Col. 30, line 25 change "enooding" to -- encoding --.

Signed and Sealed this

Twenty-second Day of November, 1988

Attest:

DONALD J. QUIGG

Attesting Officer   Commissioner of Patents and Trademarks